(12) United States Patent
Cannon et al.

(10) Patent No.: US 7,657,577 B2
(45) Date of Patent: *Feb. 2, 2010

(54) MAINTAINING ACTIVE-ONLY STORAGE POOLS

(75) Inventors: David Maxwell Cannon, Tucson, AZ (US); Howard Newton Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 390 days.

This patent is subject to a terminal disclaimer.

(21) Appl. No.: 11/224,768

(22) Filed: Sep. 12, 2005

(65) Prior Publication Data

US 2007/0043788 A1 Feb. 22, 2007

Related U.S. Application Data

(63) Continuation-in-part of application No. 11/206,488, filed on Aug. 17, 2005.

(51) Int. Cl.
*G06F 12/00* (2006.01)

(52) U.S. Cl. .................. 707/203; 707/102; 707/103; 707/204; 715/229

(58) Field of Classification Search .................. None
See application file for complete search history.

(56) References Cited

U.S. PATENT DOCUMENTS

| | | | | |
|---|---|---|---|---|
| 5,644,766 A * | 7/1997 | Coy et al. | .................. | 707/204 |
| 5,761,677 A | 6/1998 | Senator et al. | | |
| 5,819,295 A * | 10/1998 | Nakagawa et al. | .......... | 707/203 |
| 5,920,867 A * | 7/1999 | Van Huben et al. | ......... | 707/101 |
| 5,983,239 A | 11/1999 | Cannon | | |
| 6,021,415 A | 2/2000 | Cannon et al. | | |
| 6,023,706 A | 2/2000 | Schmuck et al. | | |
| 6,098,074 A | 8/2000 | Cannon et al. | | |
| 6,330,572 B1 | 12/2001 | Sitka | | |
| 6,351,753 B1 * | 2/2002 | Jagadish et al. | ............. | 707/203 |
| 6,366,988 B1 * | 4/2002 | Skiba et al. | ................. | 711/165 |

(Continued)

FOREIGN PATENT DOCUMENTS

JP 62281038 12/1987

OTHER PUBLICATIONS

U.S. Application entitled "Maintaining an Aggregate Including Active Files in a Storage Pool in a Random Access Medium", filed Aug. 15, 2005, U.S. Appl. No. 11/206,496, by inventors D.M. Cannon and H.N. Martin.

(Continued)

*Primary Examiner*—Khanh B Pham
*Assistant Examiner*—Andalib F Lodhi
(74) *Attorney, Agent, or Firm*—David W. Victor; Konrad Raynes and Victor LLP

(57) ABSTRACT

Provided are a method, system, and program for maintaining active-only storage pools. A first storage pool includes at least a first aggregate including a plurality of active and inactive files. A second aggregate is generated in a second storage pool. A determination is made of active versions of files in the first aggregate that satisfy at least one criterion. The determined active versions of files are copied from the first aggregate to the second aggregate in the second storage pool, wherein the second aggregate does not include inactive versions of files in the first storage pool.

30 Claims, 17 Drawing Sheets

U.S. PATENT DOCUMENTS

| | | | |
|---|---|---|---|
| 6,886,018 B1* | 4/2005 | Boudris et al. | 707/203 |
| 6,889,249 B2 | 5/2005 | Miloushev et al. | |
| 7,024,429 B2* | 4/2006 | Ngo et al. | 707/201 |
| 7,039,661 B1* | 5/2006 | Ranade | 707/204 |
| 7,069,401 B1* | 6/2006 | Noonan et al. | 711/162 |
| 7,096,330 B1* | 8/2006 | Root et al. | 711/162 |
| 7,130,970 B2* | 10/2006 | Devassy et al. | 711/154 |
| 7,191,552 B1 | 3/2007 | Husom | |
| 7,243,103 B2* | 7/2007 | Murphy et al. | 707/10 |
| 2001/0042073 A1* | 11/2001 | Saether et al. | 707/203 |
| 2002/0120763 A1 | 8/2002 | Miloushev et al. | |
| 2003/0078930 A1 | 4/2003 | Surcouf et al. | |
| 2003/0154220 A1 | 8/2003 | Cannon | |
| 2003/0154238 A1 | 8/2003 | Murphy et al. | |
| 2004/0133577 A1 | 7/2004 | Miloushev et al. | |
| 2004/0186826 A1 | 9/2004 | Choi et al. | |
| 2004/0199521 A1 | 10/2004 | Anglin et al. | |
| 2005/0137731 A1 | 6/2005 | Haag et al. | |
| 2005/0165722 A1 | 7/2005 | Cannon et al. | |
| 2005/0229031 A1 | 10/2005 | Kojenov et al. | |
| 2007/0005666 A1* | 1/2007 | Klein et al. | 707/203 |
| 2007/0043785 A1 | 2/2007 | Cannon et al. | |

OTHER PUBLICATIONS

J.J. Daudenarde, et al., "Implementation of a File System with a Fast and Selective Recovery", IBM Corporation, Technical Disclosure Bulletin, Feb. 1987, pp. 3837-3838.

U.S. Patent Application entitled "Maintaining Active-Only Copy Storage Pools", serial number not yet assigned, filed Sep. 12, 2005, by inventors D.M. Cannon and H.N. Martin.

EPO document entitled "Communication pursuant to Article 94(3) EPC" dated Jun. 9, 2008, pp. 1-6, for application Serial No. 06 777 449.7-2201.

EPO document entitled "Communication pursuant to Article 94(3) EPC" dated Jun. 6, 2008, pp. 1-5, for application Serial No. 06 763 848.6-2201.

PCT International Search Report and Written Opinion mailed Nov. 13, 2006 for PCT/EP2006/063455 filed Jun. 22, 2006.

First Office Action for U.S. Appl. No. 11/206,496, dated Jan. 2, 2008, 23 pp.

Final Office Action for U.S. Appl. No. 11/206,496, dated Jul. 9, 2008, 17 pp.

Notice of Allowance for U.S. Appl. No. 11/206,496, dated Jan. 29, 2009, 12 pp.

First Office Action for U.S. Appl. No. 11/206,488, dated Dec. 11, 2007, 20 pp.

Final Office Action for U.S. Appl. No. 11/206,488, dated Jun. 12, 2008, 15 pp.

Notice of Allowance for U.S. Appl. No. 11/206,488, dated Dec. 15, 2008, 10 pp.

First Office Action for U.S. Appl. No. 11/224,852, dated Dec. 27, 2007, 16 pp.

Final Office Action for U.S. Appl. No. 11/224,852, dated Jun. 25, 2008, 15 pp.

Notice of Allowance for U.S. Appl. No. 11/224,852, dated Jan. 6, 2009, 15 pp.

PCT International Search Report and Written Opinion mailed Nov. 10, 2006 for PCT/EP2006/063511 filed Jun. 23, 2006.

Translation of First Office Action from Chinese (PRC) Patent Office for Application No. 2006800283841, dated Jul. 17, 2009, 10 pp.

First Office Action, dated Jul. 17, 2009, from Chinese (PRC Patent Officefor CN Application No. 2006800283841, 5 pp.

First Office Action, dated Jul. 17, 2009, from Chinese (PRC) Patent Officefor CN Application No. 2006800283150, 7 pp.

Translation of First Office Action from Chinese (PRC) Patent Office for Application No. 2006800283150, dated Jul. 17, 2009, 10 pp.

* cited by examiner

File/Aggregate Information

Aggregate Information

Aggregate File Information

Primary Storage Pool (3)     Active-Only Copy Storage Pool (4)

File/Aggregate Information     Aggregate Information     Aggregate File Information Legacy Primary Storage Pool (5)    Active-Only Primary Storage Pool (6)

Active-Only Primary Storage Pool (6)　　Legacy Primary Storage Pool (5)

File/Aggregate Information (734)

| ID | Size | Pool |
|---|---|---|
| 100 | 30 | 5 |
| 400 | 10 | 5 |
| 555 | 20 | 6 |
| 400 | 10 | 6 |
| 560 | 20 | 5 |
| 560 | 20 | 6 |

Aggregate Information (736)

| Aggr. ID | Size | Number Files |
|---|---|---|
| 100 | 30 | 3 |
| 555 | 20 | 2 |
| 560 | 20 | 2 |

Aggregate File Information (738)

| ID | Aggr. ID | Offset | Length |
|---|---|---|---|
| 100 | 100 | 0 | 10 |
| 200 | 100 | 10 | 10 |
| 300 | 100 | 20 | 10 |
| 100 | 555 | 0 | 10 |
| 200 | 555 | 0 | 0 |
| 300 | 555 | 0 | 0 |
| 500 | 560 | 0 | 10 |
| 600 | 560 | 10 | 10 | ived are a method, system, and program for maintain-
MAINTAINING ACTIVE-ONLY STORAGE POOLS

RELATED APPLICATIONS

This application is a continuation-in-part of U.S. patent application entitled "Maintaining An Aggregate Including Active Files In A Storage Pool", by David M. Cannon and Howard N. Martin, having U.S. application Ser. No. 11/206,488 and filed on Aug. 17, 2005, which patent application is incorporated herein by reference in its entirety.

BACKGROUND OF THE INVENTION

1. Field of the Invention

The present invention relates to a method, system, and program for maintaining active-only storage pools.

2. Description of the Related Art

Storage management software maintains a repository for data by backing-up, archiving or migrating data from client nodes in a computer network. A storage management server stores data objects or files in one or more storage pools maintained in storage devices. The storage management server may use a database to track information about the stored files, including their location, status, policy information on the files, etc. The storage management software may also be used to restore data. The storage management software may maintain a hierarchy of storage devices, where a first level of the hierarchy includes the faster access devices, such as disk drives, storing more frequently used and accessed files. Lower levels in the hierarchy provide slower access storage devices, such as lower performance disk drives and tape drives, to store less frequently accessed or inactive data. One example of storage management software is the Tivoli® Storage Manager product marketed by International Business Machines Corporation (IBM®). (Tivoli and IBM are registered trademarks of IBM).

To improve data transfer performance, the storage management software may aggregate individual files in a storage pool, so that moving and copying operations may be performed with respect to an aggregate of files instead of single files. U.S. Pat. No. 6,098,074 describes an aggregation technique in which objects being stored are aggregated into a "managed file." The objects may thereafter be tracked and moved as a single managed file within the storage hierarchy. When appropriate, individual objects can be processed individually such as for deletion or retrieval operations. The copending and commonly assigned patent application entitled "Method, System, And Program For Storing Data For Retrieval And Transfer", having Ser. No. 10/766,576 and filed on Jan. 27, 2004, describes further techniques for managing files in aggregates.

Data, including both active and inactive files, in a primary storage pool may be copied to a copy storage pool, which may provide off-site backup and disaster recovery for the primary storage pool. As the amount of user data in primary storage pools continues to increase, the size and number of copy storage pools needed to backup data from the primary storage pools continues to increase. The copy storage pools may comprise a slower access device, such as tape, than the devices used for the primary storage pool, such as disks. Further, to restore data from the copy storage pool, the data may first be staged from the copy storage pool tape to a hard disk drive pool and then restored from the hard disk drive.

Further improvements in data storage may be useful in a variety of applications.

SUMMARY

Provided are a method, system, and program for maintaining active-only storage pools. A first storage pool includes at least a first aggregate including a plurality of active and inactive files. A second aggregate is generated in a second storage pool. A determination is made of active versions of files in the first aggregate that satisfy at least one criterion. The determined active versions of files are copied from the first aggregate to the second aggregate in the second storage pool, wherein the second aggregate does not include inactive versions of files in the first storage pool.

DETAILED DESCRIPTION

Figure 1:
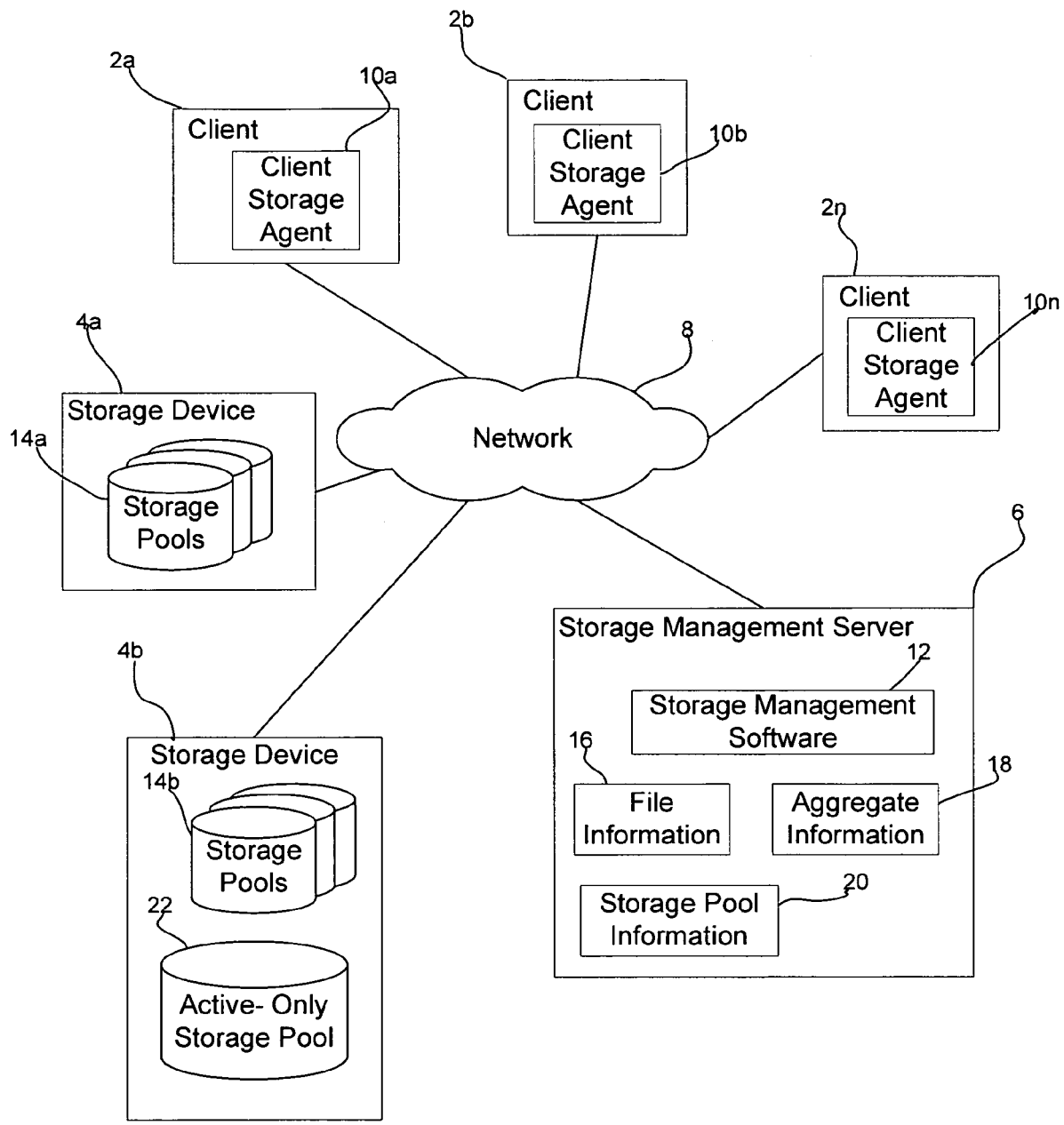
FIG. 1 illustrates an embodiment of a network computing environment.

FIG. 1 illustrates a computing environment in which embodiments are implemented. A plurality of clients 2*a*, 2*b* . . . 2*n*, storage devices 4*a*, 4*b*, and a storage management server 6 are in communication over a network 8. The storage management server 6 may access storage devices 4*a*, 4*b* over the network 8. Alternatively, a storage device may be attached directly to the storage management server 6 and accessed over a bus. The clients 2*a*, 2*b* . . . 2*n* include client storage agents 10*a*, 10*b* . . . 10*n* and the storage management server 6 includes storage management software 12. The client storage agents 10*a*, 10*b* . . . 10*n* and the storage management software 12 interact to manage the storage of files in storage pools 14*a*, 14*b* implemented in the storage devices 4*a*, 4*b*. The storage management software 12 may maintain a storage hierarchy system in which storage pools 14*a*, 14*b* are defined to have level information, such that files at a higher level may be migrated to a lower level according to a hierarchical storage policy, e.g., to move less frequently accessed files to storage pools at a lower level in the hierarchy having slower access devices. The storage in the higher level may comprise faster access devices, such as hard disk drives, whereas the storage at lower levels may comprise slower access devices, such as slower hard disk drives, tape drives, etc. For instance, storage pools high in the hierarchy include more frequently or recently used data and are implemented in relatively faster access storage devices, whereas storage pools lower in the hierarchy may provide more long term storage of data and be implemented in a tape storage medium. In certain embodiments, the client storage agents 10*a*, 10*b* . . . 10*n* may access, backup, archive and restore data through the storage management software 12, which manages access to files in the storage pools 14*a*, 14*b*. Further, the storage management software 12 may backup and archive data from the clients 2*a*, 2*b*, 2*c*.

The storage management software 12 maintains information on the files in the storage pools, including file information 16, aggregate information 18, and storage pool information 20. The information 16, 18, and 20 may be implemented in one or more database tables of a relational database or other suitable data structures known in the art. The file information 16 may comprise an inventory table having information on every file in the storage pools 14*a*, 14*b*, including client and policy information. The aggregate information 18 comprises information on aggregates defined in the storage pools 14*a*, 14*b*. An aggregate comprises a managed file in one storage pool in which one or more files are written. An aggregate simplifies file movement operations (e.g., storage pool backup, restore, reclamation or movement to another pool which includes migration to another location within the hierarchy) because the storage management software 12 need only specify a data transfer operation with respect to an aggregate, and the storage management software 12 will then perform the requested operation with respect to the files grouped by the aggregate. Further, an aggregate may provide for the storage of the associated files in a single managed file that may be readily subject to a data transfer operation.

The storage pool information 20 contains information about where each file is stored in the storage hierarchy implemented in the storage pools 14*a*, 14*b*. The storage table contains an entry for each managed file.

A storage pool 14*a*, 14*b* may be implemented as a sequential access storage pool in which data is stored sequentially in a file volume, where the volume is a file in the underlying file system. Space from a deleted file in a sequential-access disk pool is recovered by consolidating valid data on a new file volume during a reclamation operation. Additionally, the storage pools 14*a*, 14*b* may also be organized as a random-access disk pools in which space is allocated in random blocks, such that once a file is deleted from a random-access storage pool, the space is immediately available for use.

In one embodiment, a storage pool may be defined as an active-only storage pool 22, such that only active files are maintained in that storage pool 22, not inactive files. An inactive file is any file that has been deactivated according to some criteria. For instance, a file may be considered inactive if it is updated, deleted or is a file whose age exceeds an aging policy. A file may be updated or deleted on a client system 2*a*, 2*b* . . . 2*n*, and then when that update is supplied to the storage management server 6, the deactivated file may be marked as inactive. A file may also be updated or deleted directly by the storage management software 12. An update to a file results in both an active version of the file having the update and an inactive version of the pre-updated file.

In one embodiment, the active-only storage pool 22 may be implemented as a sequential-access disk pool, such that all files in an aggregate stored in the active-only storage pool 22 are written sequentially to a sequential file volume in the storage pool 22. A sequential file volume comprises a file on a random access media, such as a hard disk drive, that is managed as a tape device where data is written sequentially. The aggregate and its included files are written to a sequential file volume. A storage pool can have multiple sequential file volumes and each sequential file volume can have one or more aggregates. When the sequential file volume reaches a predefined size, then the sequential file volume is closed and a new sequential file volume is added to the storage pool to fill-up. So an update can be in the same file volume including the aggregate having the unmodified version of the file or in a different file in the active-only storage pool.

The clients 2*a*, 2*b* . . . 2*n* may comprise a suitable computational device known in the art, such as a workstation, desktop computer, server, mainframe, hand held computer, telephony device, etc. The storage management server 6 may comprise a suitable server class machine. The network 8 may comprise a Local Area Network (LAN), Storage Area Network (SAN), Wide Area Network (WAN), wireless network, etc. The storage devices 4*a*, 4*b* be implemented in storage devices known in the art, such as one hard disk drive, a plurality of interconnected hard disk drives configured as Direct Access Storage Device (DASD), Redundant Array of Independent Disks (RAID), Just a Bunch of Disks (JBOD), etc., a tape device, an optical disk device, a non-volatile electronic memory device (e.g., Flash Disk), a tape library, etc.

Figure 2:
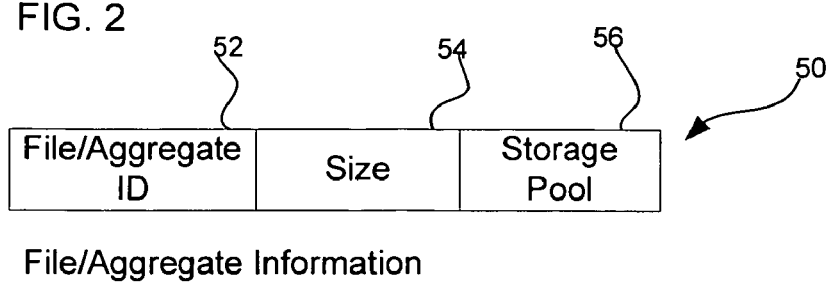
FIGS. 2, 3, and 4 illustrate embodiments of information on files and aggregates of files maintained in storage pools.

FIG. 2 illustrates an embodiment of file/aggregate information 50 maintained for every aggregate managed file and file outside of an aggregate managed file within a storage pool. The file/aggregate information 50 may be part of the aggregate information 18. Each file/aggregate information 50 instance includes an identifier (ID) 52 of the file or aggregate managed file; a size 54 (e.g., byte length) of the file or aggregate, where an aggregate size is the size of all files included in the aggregate managed file; and a storage pool 56 identifying the storage pool 14*a*, 14*b* including the file or aggregate managed file.

Figure 3:
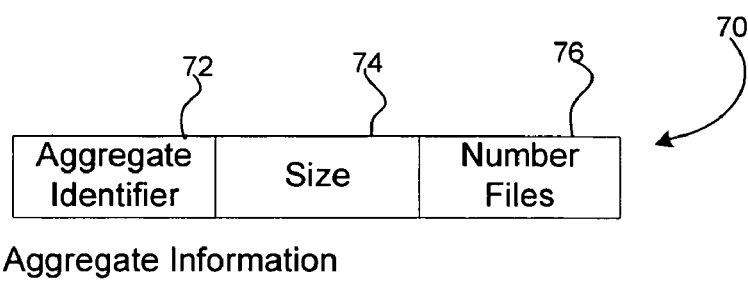

FIG. 3 illustrates an embodiment of aggregate information 70 maintained for every aggregate managed file. The aggregate information 70 may be part of the aggregate information 18. Each aggregate information 70 instance includes: an identifier 72 of the aggregate; a size 74 of all the files included in the aggregate managed file; and a number of files (objects) 76 included in the aggregate managed file.

Figure 4:
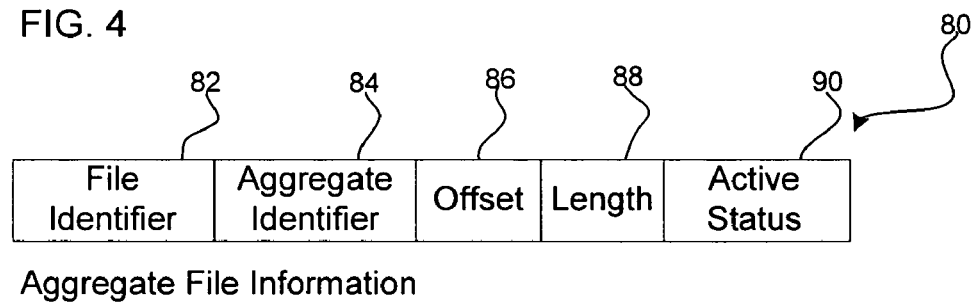

FIG. 4 illustrates an embodiment of aggregate file information 80 maintained for every file included in one aggregate managed file. The aggregate information 70 may be part of the file information 16 or the aggregate information 18. Each aggregate file information 80 instance includes: a file identifier 82, such as the file name; an aggregate identifier 84 indicating the aggregate in which the file is included; an offset 86 indicating the byte offset from the beginning of the aggregate managed file at which the file starts; a length 88 of the file; and an active status 90 indicating whether the file is active or inactive.

Figure 5:
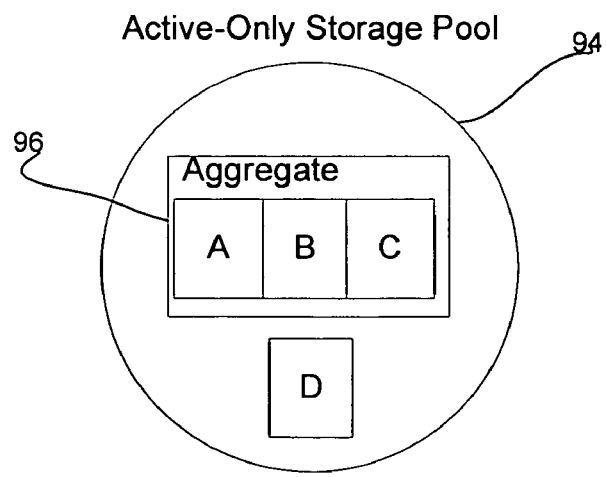
FIG. 5 illustrates an embodiment of an active-only storage pool.

FIG. 5 illustrates an active-only storage pool 94 implemented as a sequential access device including one aggregate 96 having three files A, B, C in one of the storage devices 4*a*, 4b. Files added to the aggregate may be added sequentially following the last file written to the aggregate 96. The active-only storage pool 96 may include additional aggregates as well as files not included in an aggregate, such as file D.

Figure 6:
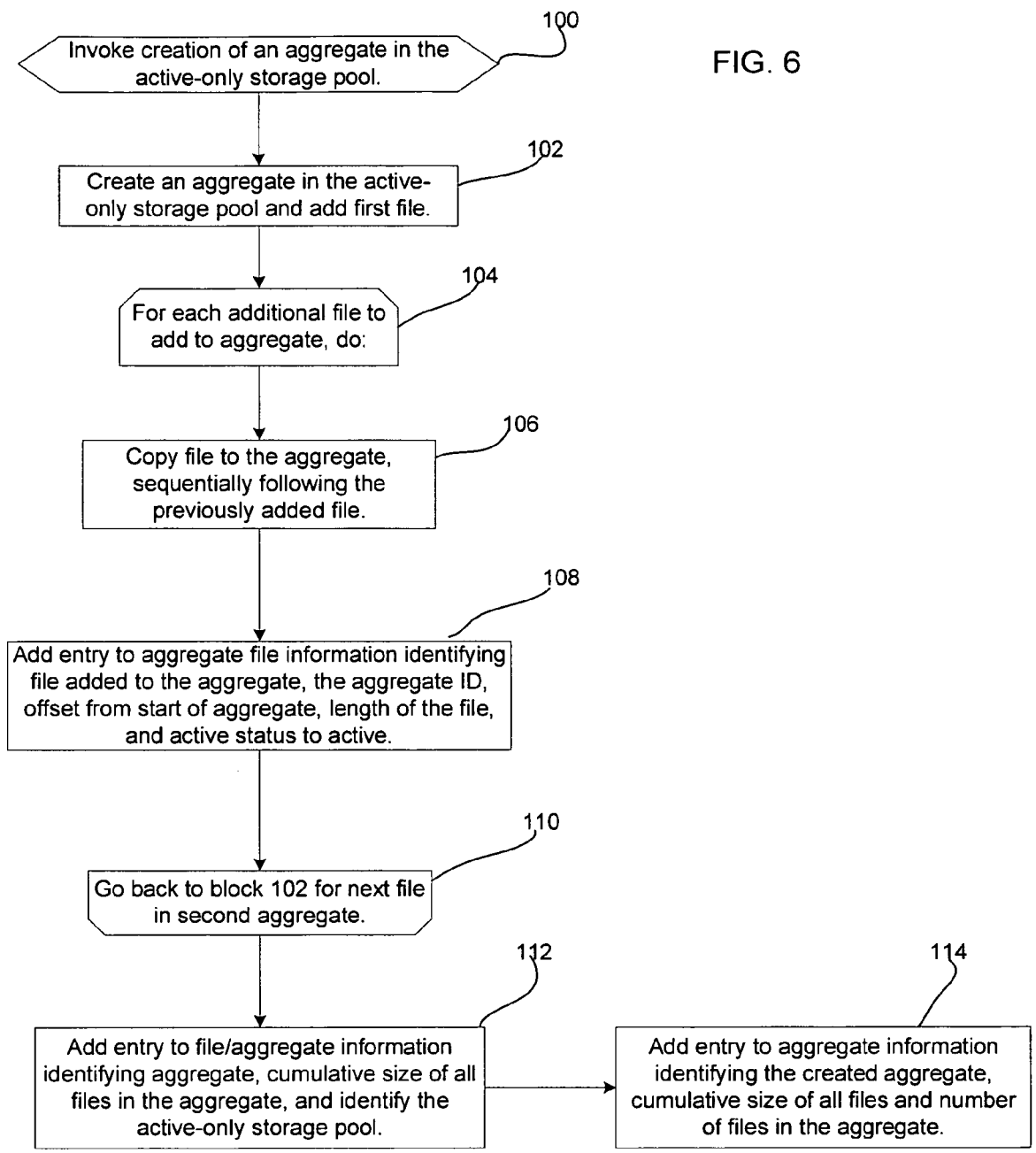
FIG. 6 illustrates an embodiment of operations to create an aggregate in an active-only storage pool.

FIG. 6 illustrates operations performed by the storage management software 12 to create an aggregate in the active-only storage pool 94. The invocation of the storage management software 12 (at block 100) to create an aggregate may be initiated by one client storage agent 10a, 10b . . . 10n or an administrator at the storage management server 6. An aggregate 96 is created (at block 102) in the active-only-storage pool 94 and the first file is added, e.g., file A in FIG. 5. A loop is performed at blocks 104 through 110 for each additional file to add to the aggregate 94. The file to add is copied (at block 106) to the aggregate 94, sequentially following the previously added file. The storage management software 12 adds (at block 108) an aggregate file information entry 80 to the file 16 or aggregate 18 information, including: an identifier 82 of the file added to the aggregate; the aggregate ID 84, offset 86 from start of aggregate at which file is written; length 88 of the file; and sets the active status 90 to active. After adding all files to the aggregate 96, the storage management software 12 adds (at block 112) a file/aggregate information entry 50 including an aggregate ID 52 of the created aggregate 96, cumulative size 54 of all files in the aggregate 96, and identifying the active-only storage pool 56 including the created aggregate. An aggregate information entry 70 is added (at block 114) including an identifier 72 of the created aggregate, a cumulative size 74 of all files and number of files 76 in the created aggregate.

Figure 7:
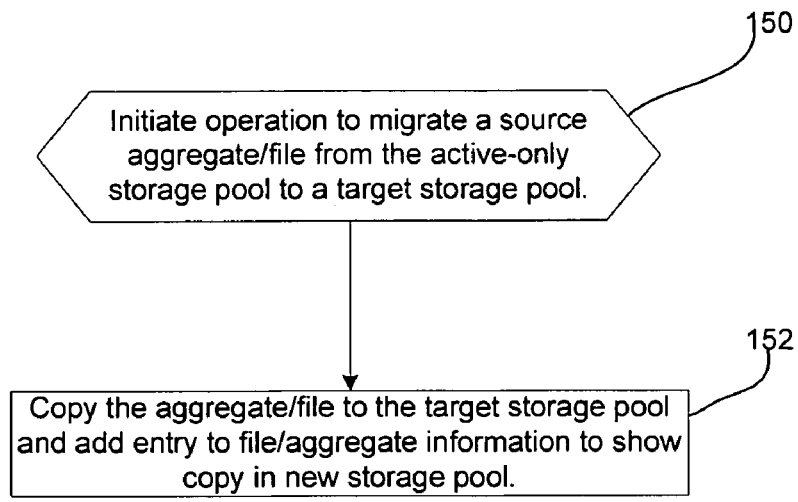
FIG. 7 illustrates an embodiment of operations to migrate an aggregate in an active-only storage pool.

FIG. 7 illustrates an embodiment of operations performed by the storage management software 12 to migrate a source aggregate to a target aggregate, which may be in a tape device. The operations of FIG. 7 may further apply to migration of files not included in an aggregate, such as file D (FIG. 5). Upon initiating (at block 150) an operation to migrate the source aggregate (or source file), the storage management software 12 copies (at block 152) the aggregate 96 (file) to the target storage pool and adds an entry to the file/aggregate information 50 to show the copy of the aggregate (file) in the new storage pool.

Figure 8:
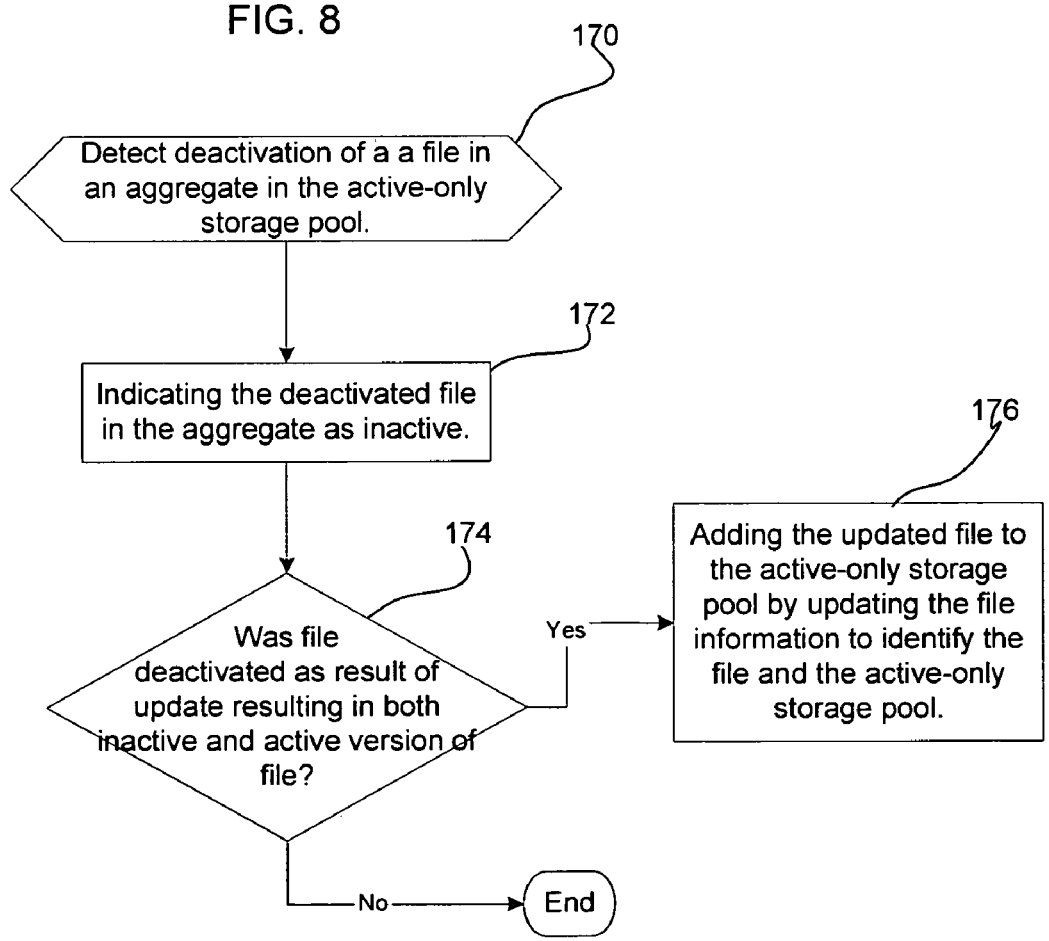
FIG. 8 illustrates an embodiment of operations to deactivate a file in an aggregate in an active-only storage pool.

FIG. 8 illustrates an embodiment of operations performed by the storage management software 12 to process (at block 170) a deactivation of a file in the aggregate 96 in the active-only storage pool 94. As mentioned a file may be deactivated if the file is updated, producing both an active version having the update and an inactive version. Certain deactivations may produce only an inactive version of the file, such as if the file is deleted or the file's age exceeds a policy criteria. In response to the deactivation, the storage management software 12 indicates (at block 172) the active status 90 of the deactivated file in the aggregate as inactive. If (at block 174) the file was deactivated as a result of an update operation, then the active version is added (at block 176) to the active-only storage pool 94 by updating the file information to identify the file and the active-only storage pool. This operation may involve adding an entry 50 to the file/aggregate information for the updated file and assigning a new ID 52 and indicating the size 54 and storage pool 56 including the updated file. Alternatively, the updated active file may be stored in an aggregate with other files and/or copied to other storage pools. If (at block 172) the file was not deactivated in a manner that results in both an active and inactive version, then control ends.

Figure 9:
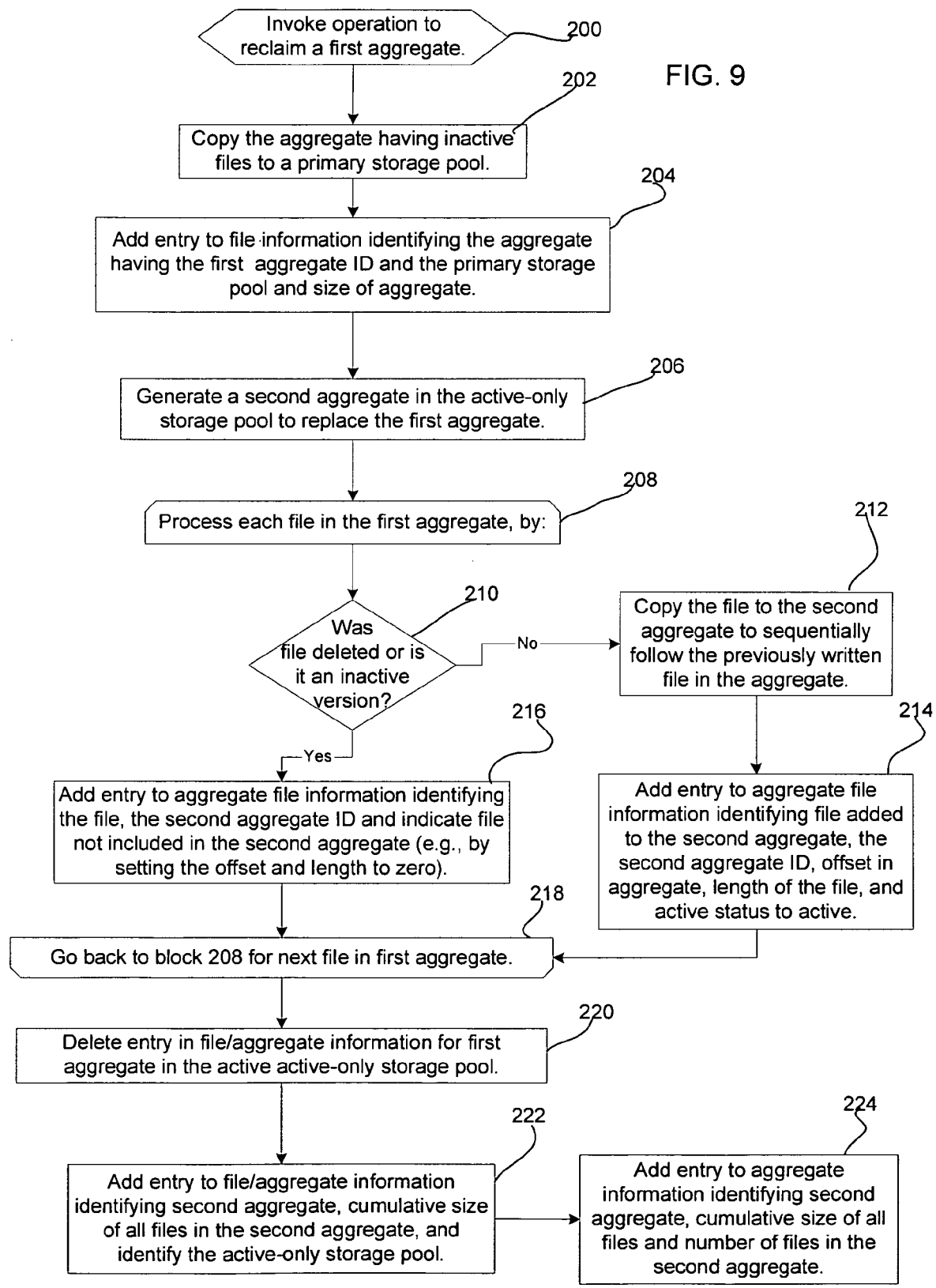
FIG. 9 illustrates an embodiment of operations to reclaim files in an aggregate in an active-only storage pool.

FIG. 9 illustrates an embodiment of operations implemented by the storage management software 12 to reclaim free space in an aggregate in the active-only storage pool 94 in a sequential storage device, which also removes any inactive files from the aggregate in the active-only storage pool 94 to maintain only active files in the active-only storage pool 94. At block 200, an operation is invoked to reclaim one aggregate 96 in the active-only storage pool 94. This operation may be invoked periodically or in response to an event, such as an update to files in the active-only aggregate. In response, (at block 202) the aggregate having inactive files is copied to a primary storage pool. An entry 50 (FIG. 2) is added (at block 204) to the file information identifying the aggregate having the first aggregate ID, e.g., 100, and the primary storage pool and size of the copied aggregate, i.e., the length of all the files in the copied aggregate.

The storage management software 12 generates (at block 206) a second aggregate in the active-only storage pool 96 to replace the first aggregate. The second aggregate has a new identifier (ID) different from the first aggregate ID. A loop is then performed at blocks 208 through 218 for each file in the first aggregate to reclaim. If (at block 210) the file is active, i.e., not inactive or deleted, then the file is copied (at block 212) to the second aggregate to sequentially follow the previously written file in the storage device if there is already file in the aggregate, else the file is written at the start of the aggregate. An aggregate file information entry 80 is added (at block 214) including the file identifier 82, the second aggregate ID 84, the offset 86 in the second aggregate at which the file is written, the length 88 of the file, and the active status 90 is set to active. If (at block 210) the file was inactive or deleted, then an aggregate file information entry 80 (FIG. 4) is added (at block 216) for an inactive file including: the file ID 82; the second aggregate ID 84; and indication that the inactive file is not included in the second aggregate (e.g., by setting the offset and length to zero). Thus, in one embodiment, although the inactive file is no longer included in the reclaimed second aggregate, the aggregate information 18 still indicates in an aggregate file information entry 80 that the inactive file is associated with the second aggregate, but not physically included in the aggregate.

After adding all active files to the new second aggregate file, such that all active files from the first aggregate are written sequentially to the second aggregate in the active-only storage pool 94, which may comprise a sequential access disk, the entry 50 (FIG. 2) in the file/aggregate information for the first aggregate in the active active-only storage pool is deleted because it has been reclaimed by the reclaimed second aggregate that does not include the inactive files. A file/aggregate information entry 50 (FIG. 2) is added (at block 222) including the second aggregate ID 52, the cumulative size 54 of all active files in the second aggregate, and the identifier 56 of the active-only storage pool including this second aggregate. Further, an aggregate information entry 70 (FIG. 3) is added (at block 224) including the second aggregate identifier 72, the cumulative size 74 of all files and the number of files 76 in the second aggregate. Thus, during reclamation a new aggregate is created in which all active files are written sequentially removing any inactive files and reclaiming any fee space from the aggregate.

Figure 10:
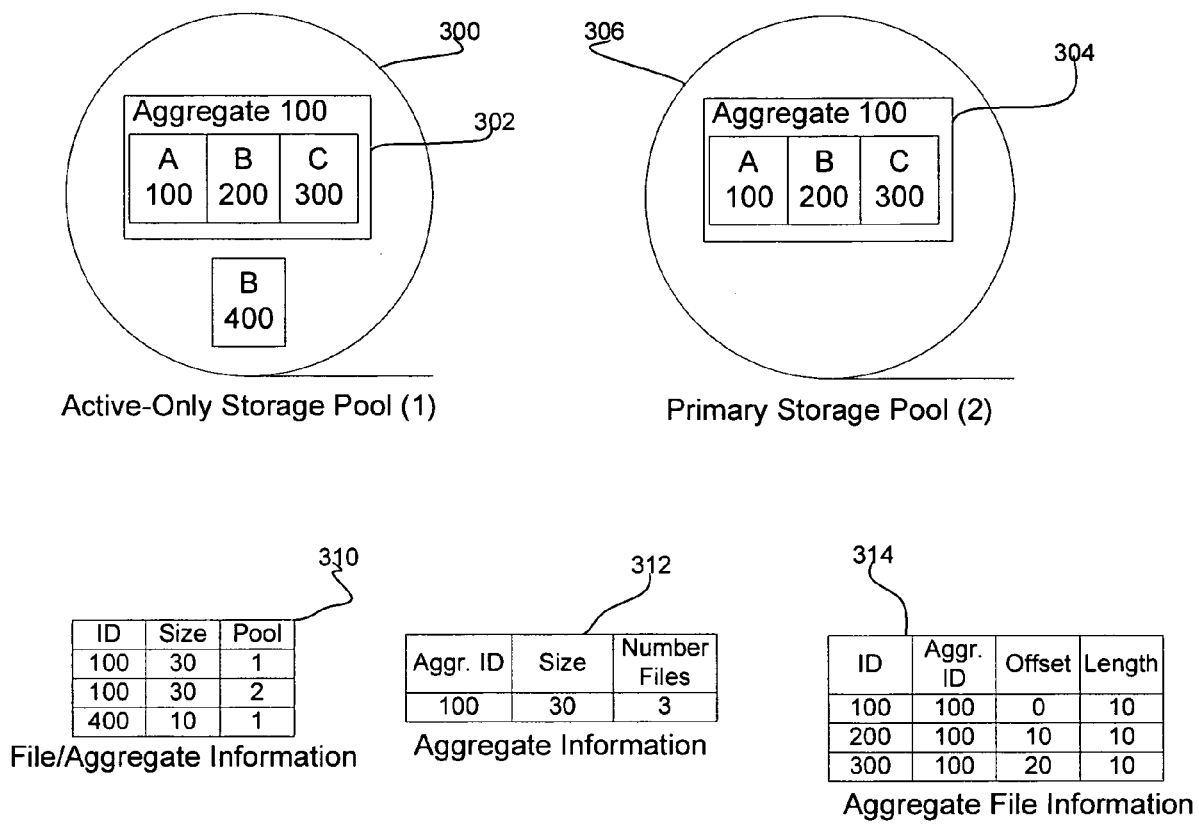
FIGS. 10 and 11 illustrate examples of an active-only storage pool, a primary storage pool, and tables of information on the files and aggregates in the active-only and primary pools.

FIG. 10 illustrates an example of storage pools and tables having information on the aggregates in the storage pools. An active-only storage pool 300, having an ID of "1", is implemented in a sequential access media including aggregate 302 having an ID of 100 and three files A, B, C having IDs of 100, 200, 300, respectively. File B 400 comprises an updated version of file B 200 in the aggregate 300. A copy 304 of the aggregate 302 including the inactive version of file B 200 is created in a primary storage pool 306. The aggregate copy 304 has the same ID, i.e., 100, as the aggregate 302. Any changes to the aggregate 302 do not affect the aggregate copy 304 in the primary storage pool 306. File B may also be copied to the primary storage pool 306.

In one embodiment, the storage management software 12 maintains a file/aggregate information table 310, an aggregate information table 312, and an aggregate file information table 314 having information on the files and aggregates in the storage pools 300. The file/aggregate information table 310 includes entries, such as entry 50 (FIG. 2), for each aggregate, including two entries for aggregate 100 (having reference numbers 302 and 304) that is in the storage pools identified as 1 and 2 (having reference numbers 300 and 306, respectively), and the updated file having identifier 400. The aggregate information table 312, such as entry 70 (FIG. 3), includes an entry for the aggregate having ID 100, which happens to be located in two storage pools 300 and 306. The aggregate file information table 314 includes entries, such as entry 80 (FIG. 4), for each file in the aggregate having ID 100. In FIG. 10, there is only one aggregate located in two storage pools, so that the aggregate file information table 314 has information on the files in this one aggregate without reference to the storage pools including this aggregate.

Figure 11:
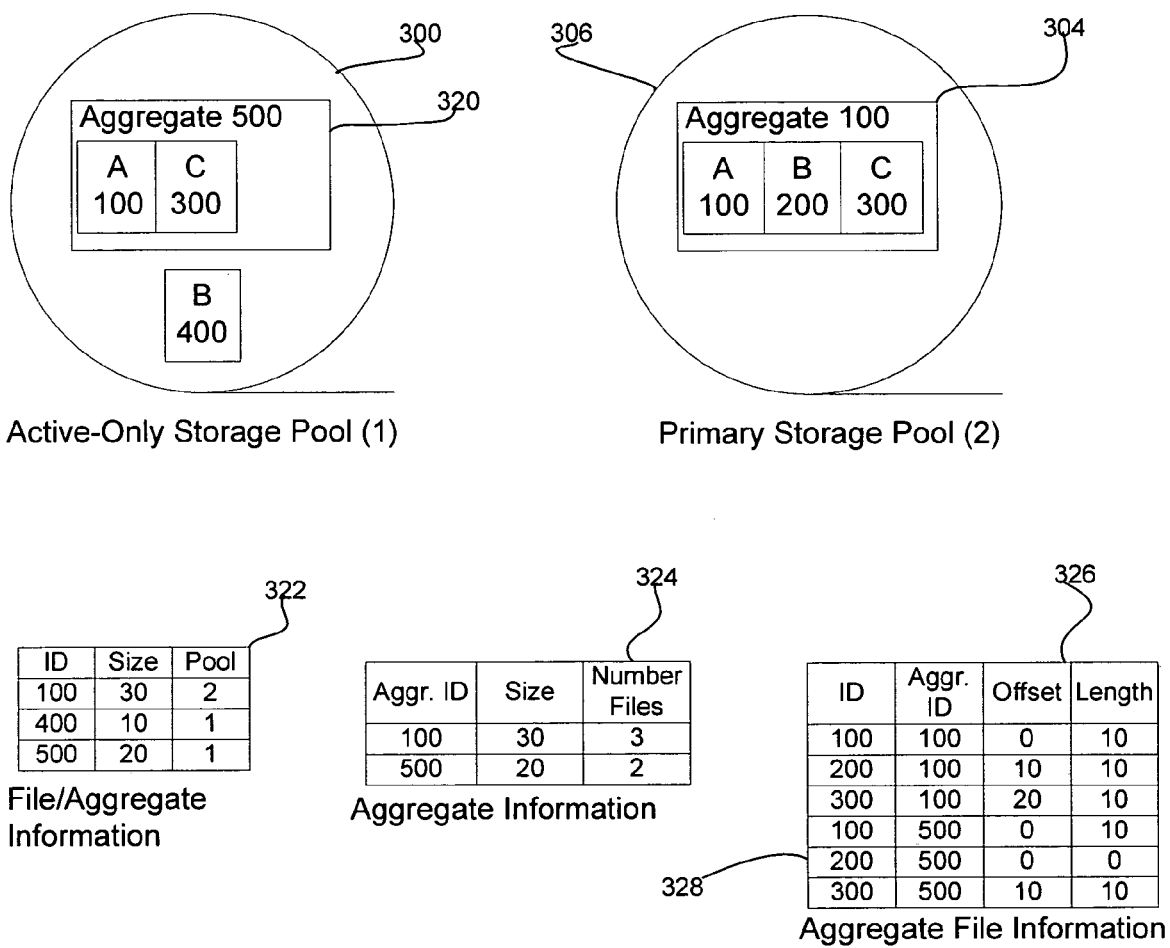

FIG. 11 illustrates an example of storage pools and tables having information on the aggregates in the storage pools after reclamation occurs with respect to the storage pool 300 in FIG. 10. FIG. 11 shows storage pools 300 and 306 as in FIG. 10 and aggregate 304 in storage pool 306. However, in storage pool 300 the aggregate 302 has been replaced by a reclaimed aggregate 320, having ID 500, in which the inactive file B 200 was removed using the operations of FIG. 9. However, the inactive file B 200 remains in the aggregate 304 in the primary storage pool 306. The updated file B 400 is also in the active-only storage pool 300.

The updated file/aggregate information table 322 for FIG. 11 includes entries for the reclaimed aggregate 500 having only active files A and C, which replaces the aggregate 100 in the active-only storage pool 300. The updated aggregate information table 324 includes an entry for the new reclaimed aggregate 500. However, there is still an entry for the aggregate having ID 100 (and having reference number 304) in the primary storage pool 306. The updated aggregate file information table 326 includes new entries for each of the active files A and C in the reclaimed aggregate ID 500 and additionally one entry 328 for the removed inactive file B 200, which is indicated as not included in the aggregate 500 by having an offset and length of zero. In this embodiment, all inactive files are removed from the aggregate in the active-only storage pool and the inactive file removed is noted in the information maintained by the storage management software 12 as shown in entry 328 in the aggregate file information table 326.

Described embodiments provide an active-only storage pool that may be implemented in a sequential media, such that any files in an aggregate in the active-only storage pool that become inactive as a result of an update or other deactivation are removed from the aggregate file during a reclamation operation, so that all the active files are written sequentially in the aggregate file. Further, by maintaining only active files in an aggregate, the client may restore the active data faster from either the active-only storage pool or a copy of the aggregate having active data, which may be on disk or tape. In this way, the active files may be streamed from the aggregate managed file on the tape or disk media. This allows the client to restore the active files faster, which the client is more likely to need than inactive files.

Active-Only Copy Storage Pools

In a further embodiment, aggregates and files in a primary storage pool may be backed-up in an active-only copy storage pool that stores only active versions of files from the primary storage pool. Maintaining an active-only copy storage pool reduces the amount of space, e.g., fewer tapes or other storage units, needed for the copy storage pool because only the active versions of files are copied. The copy storage pool may be maintained in the same or a different geographical location than the location of the primary storage pool to provide for disaster recovery.

Figure 12:
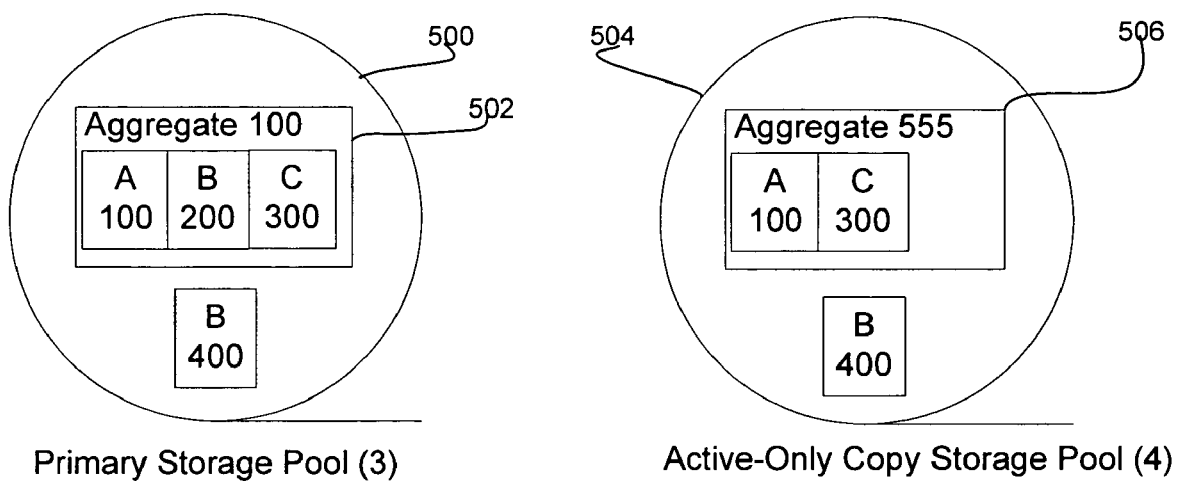
FIGS. 12, 14, and 15 illustrate examples of a primary storage pool, a copy storage pool and tables of information on the files and aggregates in the primary and copy storage pools.

FIG. 12 illustrates an example of a primary storage pool 500, having an ID of "3", implemented in a sequential access media including aggregate 502 having an ID of 100 and three files A, B, C having IDs of 100, 200, 300, respectively. File B 400 comprises an updated version of file B 200 in the aggregate 100, which is inactive. A copy storage pool 504 in a sequential access media, having an ID of "4" provides a backup copy of active-only files in the primary storage pool 500. The copy storage pool 504 includes an aggregate 506, having an ID of 555, that includes only active files from the aggregate 502. The copy storage pool 504 also includes copies of active files in the primary storage pool 500 that are not within an aggregate, such as file B 400. The copy storage pool 504 may be offsite, such as in a different geographical location, with respect to the primary storage pool 500 to provide for disaster recovery.

Figure 13:
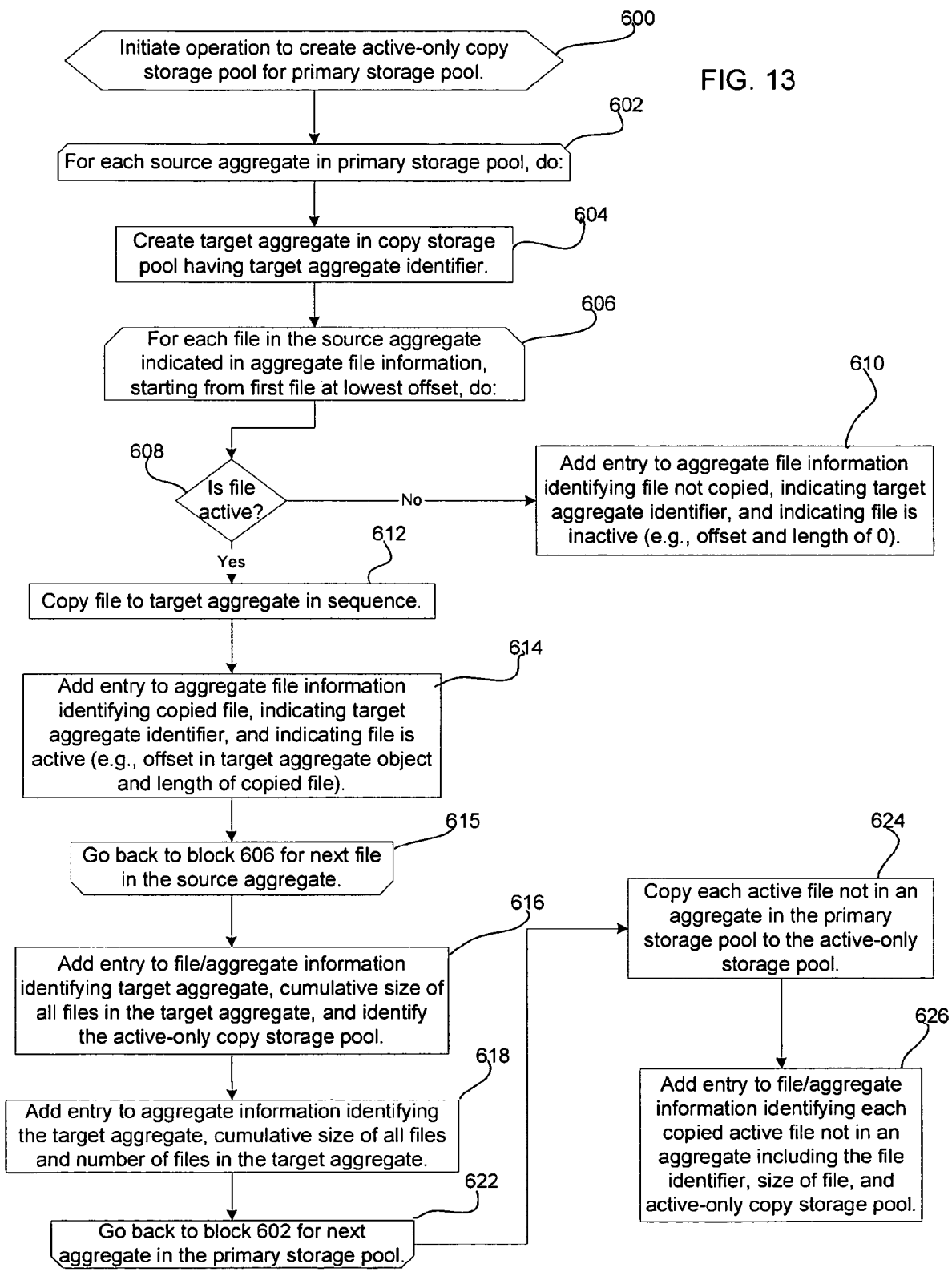
FIG. 13 illustrates an embodiment of operations to copy files and aggregates from a primary storage pool to a copy storage pool.

FIG. 13 illustrates an embodiment of operations performed by the storage management software 12 to maintain a copy of active files in a primary storage pool 500 in an active-only copy storage pool 504. Upon initiating (at block 600) operations to create an active-only copy storage pool 504 for the primary storage pool 500, the storage management software 12 performs a loop of operations at blocks 602 through 622 for each aggregate of sequentially written files in the primary storage pool 500. For each source aggregate 502 in the primary storage pool 500, the storage management software 12 creates (at block 604) a target aggregate 506 in the copy storage pool 504 having a new target aggregate identifier, e.g., 555. A loop of operations is performed at blocks 606 through 615 for each file in the source aggregate 502. The files in the source aggregate may be identified in the aggregate file information 80 having the aggregate identifier 84 for the source aggregate. The files in the source aggregate may be copied sequentially in the order in which the files are stored in the aggregate, starting from the file indicated in the aggregate file information 80 having a lowest offset 86 (FIG. 4). If (at block 608) the file being considered is inactive, then the file is not copied to the target aggregate 506. An entry may be added (at block 610) to the aggregate file information 80 for the target aggregate identifying the file not copied, indicating the target aggregate identifier, and indicating the file as inactive. A file may be indicated as inactive by setting the offset 86 and length 88 in the file information 80 for that file to zero. In this way, although an inactive file is not copied to the target aggregate 506 in the copy storage pool 504, the aggregate file information for the target aggregate identifies inactive files not copied to the target aggregate. If (at block 608) the file in the aggregate is active, then the file is copied (at block 612) to the target aggregate in sequence and an entry 80 is added (block 614) to the aggregate file information identifying the copied file, indicating the target aggregate identifier, and indicating that the file is active. The file may be indicated as active and included in the target aggregate by setting the offset to the offset of the copied file in the target aggregate and the length of the copied file. In copying the files from the aggregates in the primary storage pool to the active-only copy storage pool, empty space for files deleted from the source aggregate would be removed as files are copied to the new aggregate sequentially. In this way, the copy storage pool provides a more efficient use of storage space by removing unused space from the aggregates.

After copying all the files in one aggregate, the storage management software 12 may further add (at block 616) a file/aggregate information entry 50 identifying the target aggregate 52, cumulative size of all files in the target aggregate 54, and identify the active-only copy storage pool 56 (FIG. 2). An aggregate information entry 70 (FIG. 3) is further added (at block 618) to aggregate information identifying the target aggregate 72, cumulative size of all files 74 and number of files 76 in the target aggregate. The storage management software 12 further copies (at block 624) each active file not in an aggregate in the primary storage pool 500 to the active-only storage pool 504. A file/aggregate information entry 50 is added (at block 626) identifying each copied active file not in an aggregate including the file identifier 52, size of file 54, and the active-only copy storage pool 56.

In the embodiment of FIG. 13, the aggregates are copied before individual files not included in the aggregate. In additional embodiments, the files or aggregates in the primary storage pool may be processed in the order in which they are stored at locations in the pool, such that the copying of aggregates and files may be interleaved.

With the operations of FIG. 13, the copy storage pool maintains only active files in aggregates and outside of aggregates in a primary storage pool. Active files in the aggregate in the primary storage pool are copied sequentially to the target aggregate in the copy storage pool so they are arranged sequentially in the same order they occur in the aggregate in the primary storage pool, but without inactive files. As a result of the copy operation, the primary storage pool may maintain both active and inactive versions of files and the copy storage pool maintains only active versions of files. Files in the primary storage pool may be inactive as a result of the active version being deactiviated.

Figure 14:
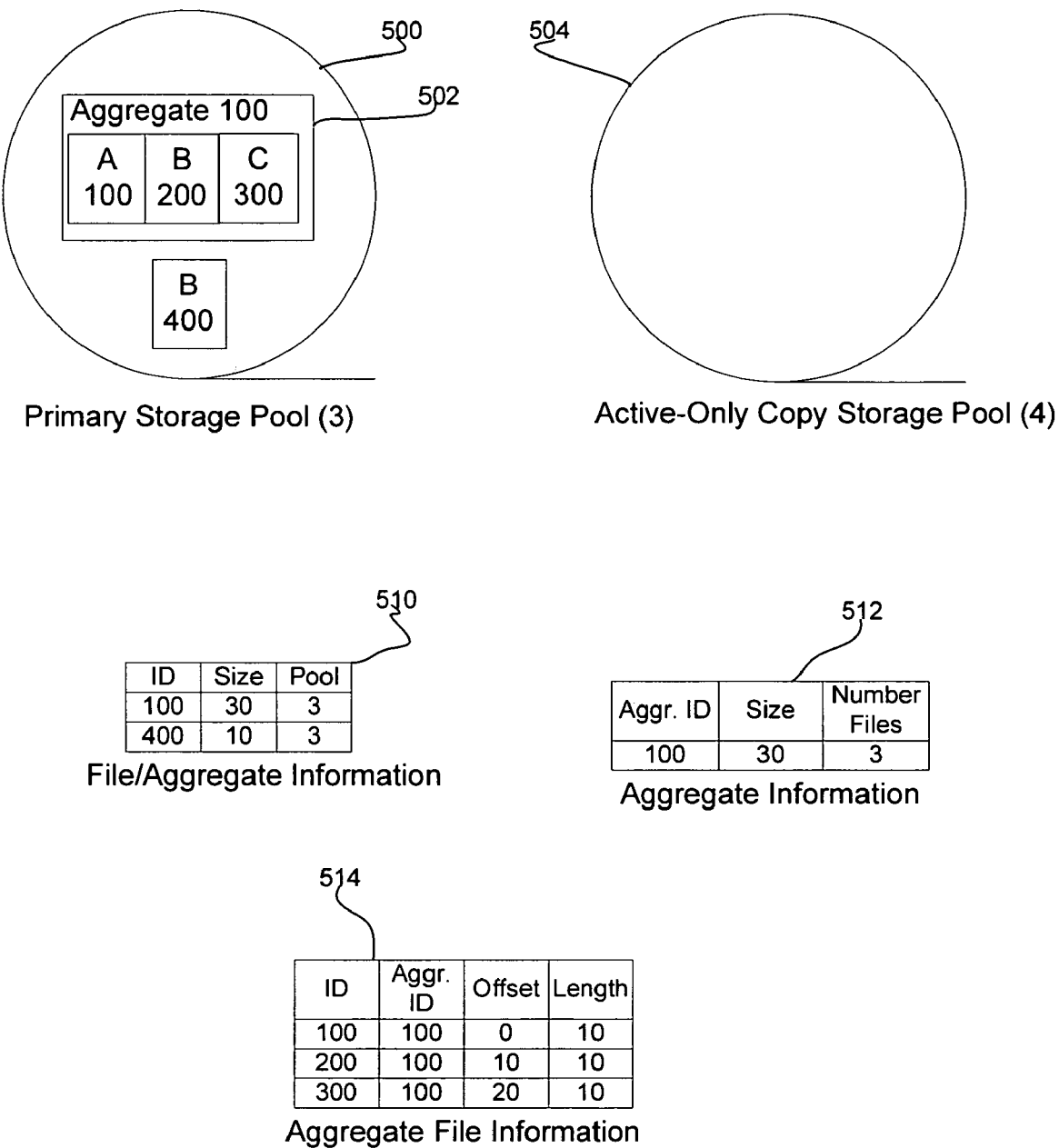

FIG. 14 illustrates an example of storage pools and tables having information on the aggregates in the storage pools. FIG. 14 shows the primary storage pool 500 shown in FIG. 12 before the files and aggregates in the primary storage pool 500 are copied to the copy storage pool 504. In one embodiment, the storage management software 12 maintains a file/aggregate information table 510, an aggregate information table 512, and an aggregate file information table 514 having information on the files and aggregates in the primary storage pool 500. The file/aggregate information table 510 includes entries, such as entry 50 (FIG. 2), for each aggregate, including an entry for aggregate 100 (having reference number 502) that is in the storage pool identified as 3 (having reference number 500), and the updated file having identifier 400. The aggregate information table 512, such as entry 70 (FIG. 3), includes an entry for the aggregate having ID 100, located in the primary storage pool 500. The aggregate file information table 514 includes entries, such as entry 80 (FIG. 4), for each file in the aggregate 502 having ID 100.

Figure 15:
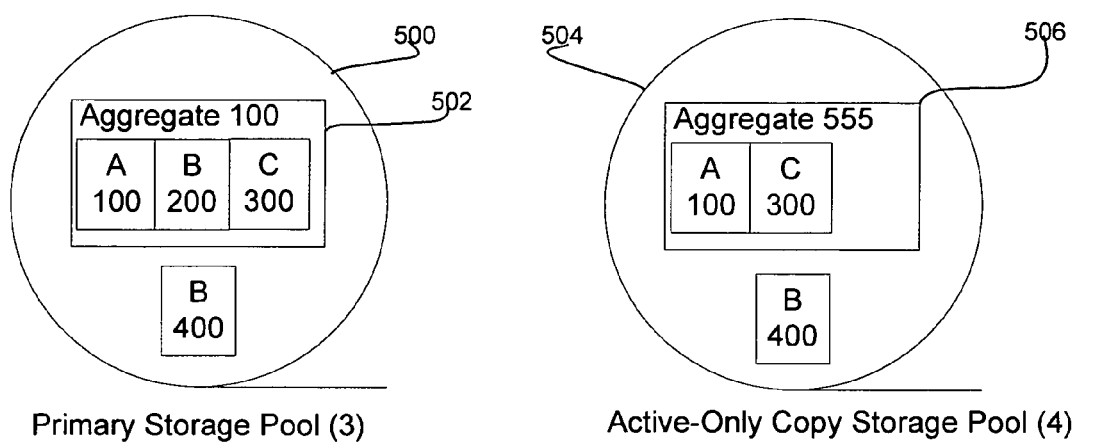
Figure 15:
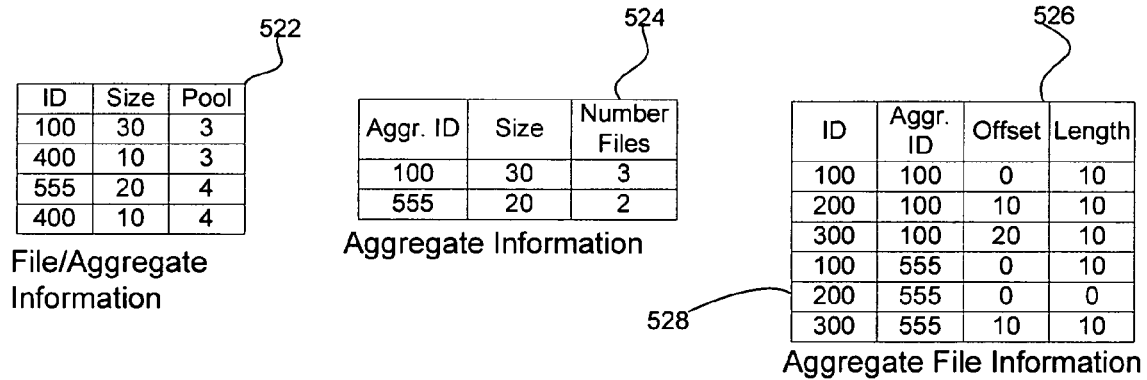

FIG. 15 illustrates an example of storage pools and tables having information on the aggregates in the storage pools after the active files in the primary storage pool 500 in FIG. 14 are copied to the active-only copy storage pool 504. FIG. 15 shows storage pools 500 and 504 as in FIGS. 12 and 14 and aggregate 506 in storage pool 504. However, in the copy storage pool 504, the aggregate 506 includes only the active files from the aggregate 502 using the operations of FIG. 13. However, the inactive file B 200 remains in the aggregate 502 in the primary storage pool 500. The updated file B 400 is copied to the active-only copy storage pool 504.

The updated file/aggregate information table 522 in FIG. 15 includes entries for the aggregate 506 (having ID 555) that includes only active files A and C to provide an active-only copy of the aggregate 502 (ID 100) in the primary storage pool 500. The updated aggregate information table 524 includes an entry for the new target aggregate 506 (ID 555) as well as the aggregate 502 (ID 100) in the primary storage pool 500. The updated aggregate file information table 526 includes new entries for the target aggregate 506, by including an entry for each file from the source aggregate 500, including active and inactive files. The table 526 includes entries for files A 100 and C 300 in the target aggregate 506, having ID 555 indicating that the files are active by indicating their offset and length. The file B 200 that was not copied to the aggregate 506 is still indicated in the entries for the target aggregate 506 (having ID 555). The inactive file is indicated as not included in the aggregate 506 by having an offset and length of zero. In this embodiment, all inactive files in the aggregate in the primary storage pool are not copied to the aggregate 506 in the copy storage pool 504, and the inactive file is noted in the information maintained for the target aggregate as shown in entry 528 in the aggregate file information table 526.

In the event of a failure or data loss in the primary storage pool, the active-only versions of the files, including files within aggregates and not within aggregates, may be recovered from the active-only copy storage pool. Entries would be added to the file and aggregate information tables to include entries, such as entries 50 (FIG. 2), 70 (FIG. 3), and 80 (FIG. 4), for the new files in the primary storage pool recovered from the active-only copy storage pool. Also, if there is failure or data loss in the primary storage pool, data in the copy storage pool can be accessed for restores to the client.

Described embodiments provide a primary and copy storage pools that may be implemented in a sequential media. The copy storage pool may maintain only active versions of files and only the active versions of aggregates in the primary storage pool, such that any files in the aggregate in the primary storage pool that become inactive as a result of an update or other deactivation are not copied to the aggregate copy in the copy storage pool. Further, by maintaining only active files in the copy storage pool, copy storage pool space is conserved and a client may restore the active data faster from an active-only copy storage pool. The active files from the active-only copy storage pool may be streamed from the aggregate managed file on the tape or disk media. This allows the client to restore the active files faster, which the client is more likely to need than inactive files.

Transfer of Data from Inactive/Active Storage Pools to Active-Only Storage Pools In a further embodiment, an active-only primary storage pool may be created from a legacy primary storage pool including both active and inactive files. After the active-only primary storage pool is created having only active files, updates are then applied first to the active-only primary storage pool and then later migrated to the legacy primary storage pool, which maintains both inactive and active files. In this way, the data in a client may be recovered from the active-only primary storage pool.

Figure 16:
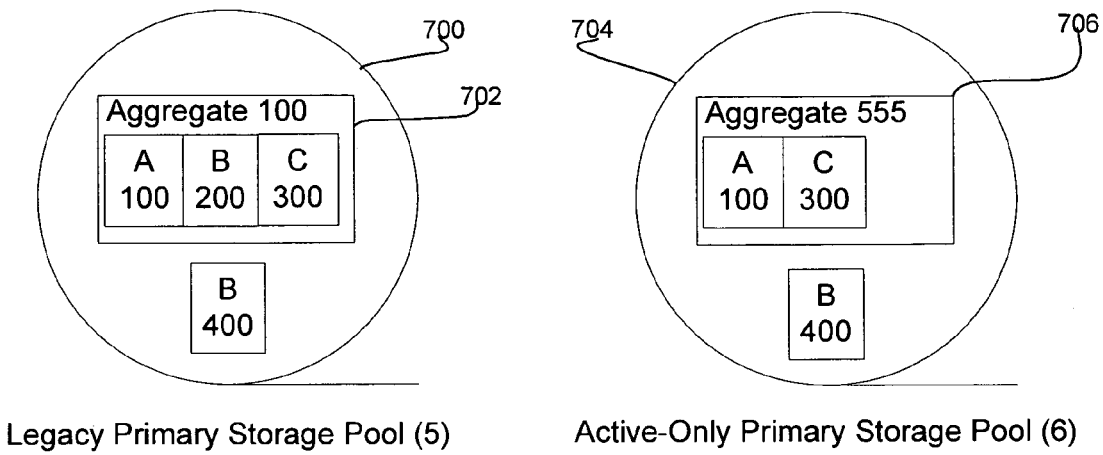
FIGS. 16, 20, and 21 illustrate examples of a legacy primary storage pool, an active-only primary storage pool and tables of information on the files and aggregates in the storage pools.

FIG. 16 illustrates an example of a legacy primary storage pool 700, having an ID of "5", implemented in a sequential access media including aggregate 702 having an ID of 100 and three files A, B, C having IDs of 100, 200, 300, respectively. File B 400 comprises an updated version of file B 200 in the aggregate 702, which is inactive. An active-only primary storage pool 704 is formed from the legacy primary storage pool 700 and may comprise a sequential access media, having an ID of "6". The active-only primary storage pool 704 includes an aggregate 706, having an ID of 555, that includes only the active files from the aggregate 702. The active-only primary storage pool 704 also includes copies of active files in the primary storage pool 700 that are not within an aggregate, such as file B 400.

Figure 17:
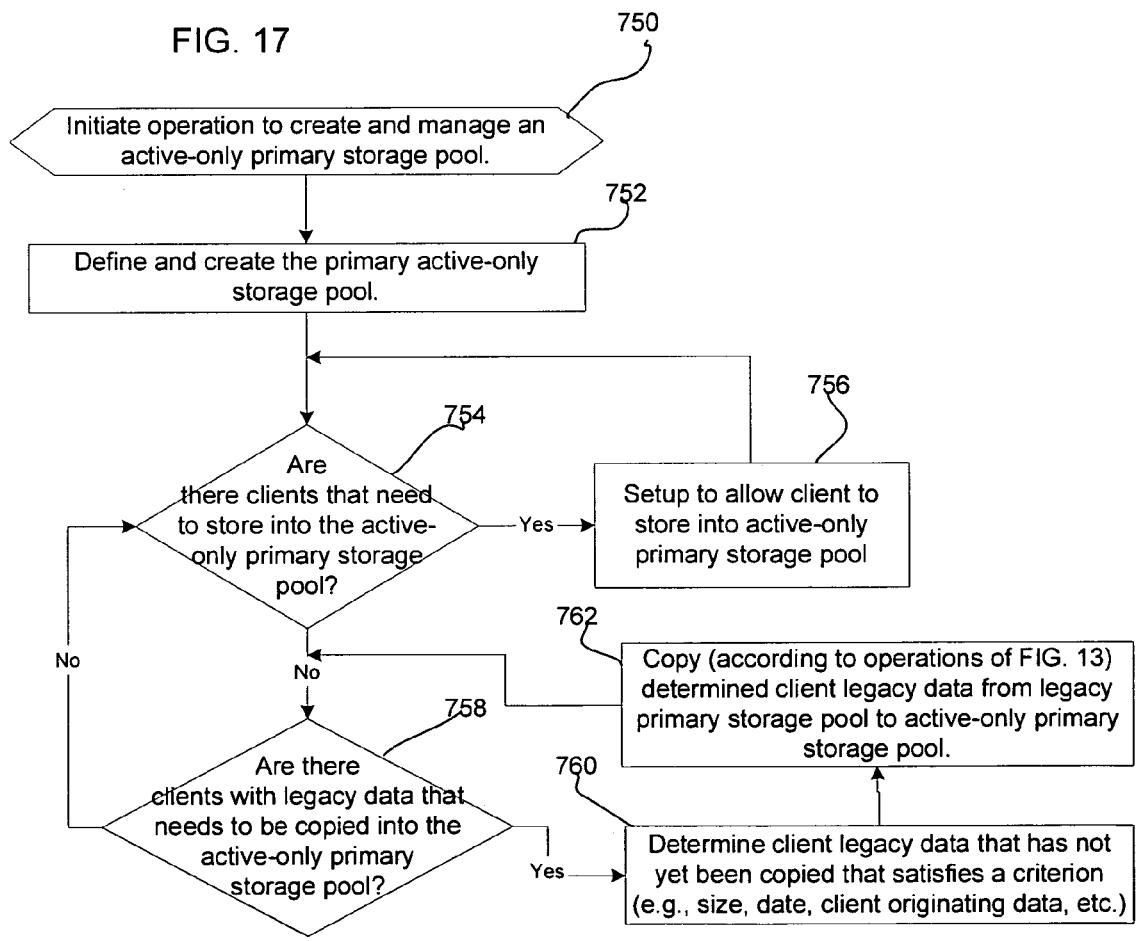
FIG. 17 illustrates an embodiment of operations to create an active-only primary storage pool from a legacy primary storage pool.

FIG. 17 illustrates an embodiment of operations performed by the storage management software 12 to create and manage an active-only primary storage pool 704 from the legacy primary storage pool 700. Upon initiating the operation (at block 750) to create the active-only primary storage pool, the storage management software 12 performs (at block 752) the operations to define and create the active-only primary storage pool 704 with active files from the legacy primary storage pool 700.

If (at block 754) there are clients that need to store into the active-only primary storage pool 704, then the storage management software 12 configures (at block 756) settings to allow the client 2a, 2b . . . 2n to store into the active-only primary storage pool 704. If (at block 754) there are no clients that need to store into the active-only primary storage pool 704 and if (at block 758) there are clients with legacy data (i.e., data in the legacy storage pools that can be active or inactive) that needs to be copied into the active-only primary storage pool 704, then the storage management software 12 determines (at block 760) client legacy data that has not yet been copied to the active-only primary storage pool 704 that satisfies one or more criterion (e.g., file size, file age, source of client originating file, etc.). The determined client legacy data is copied (at block 762) from the legacy primary storage pool 700 to the active-only primary storage pool 704 using the operations of FIG. 13 with respect to files and aggregates that have not yet been copied and that satisfy one or more criteria. From the no branch of block 758, control may proceed back to block 754 if there are clients that need to store into the active-only primary storage pool 704. With the operations of FIG. 17, updates to data can be received at the active-only primary storage pool 704 before all the data from the legacy primary storage pool 700 is copied over to the active-only primary storage pool 704.

In performing the operations of FIG. 17, in one possible situation, an administrator may create an active-only pool 704 by defining the pool to the storage management server 12 and specifying (at block 752) the disk volumes that will be used to store data in this pool. At this point, there is no data in the active-only pool, but merely a repository into which data can be stored. The administrator then changes (at block 756) settings so new files belonging to client machines A, B and C are stored directly in the active-only pool, i.e., step 754 in FIG. 17. The administrator then issues commands to copy (at block 760 and 762) legacy data (data stored before the active-only pool was created) belonging to client nodes A, B and C from the legacy primary storage pool 700 into the active-only primary storage pool 704. At this point, all active files belonging to client nodes A, B and C are stored in the active-only primary storage pool 704, and any new files sent from these client machines will be stored initially in the active-only primary storage pool 704. Later the administrator may decide to store (at blocks 754 and 756) active data for all client nodes 2a, 2b . . . 2n in the active-only primary storage pool 704 and changes settings so all new data will be stored in the active-only primary storage pool 704. The administrator also copies (at blocks 760 and 762) data from the legacy primary storage pool 700 to the active-only primary storage pool 704 for nodes other than A, B, and C whose data are now being stored in the active-only primary storage pool 704. Because the copy is incremental, data already residing in the active-only pool (for example, data for client nodes A, B and C) will not be copied.

Figure 18:
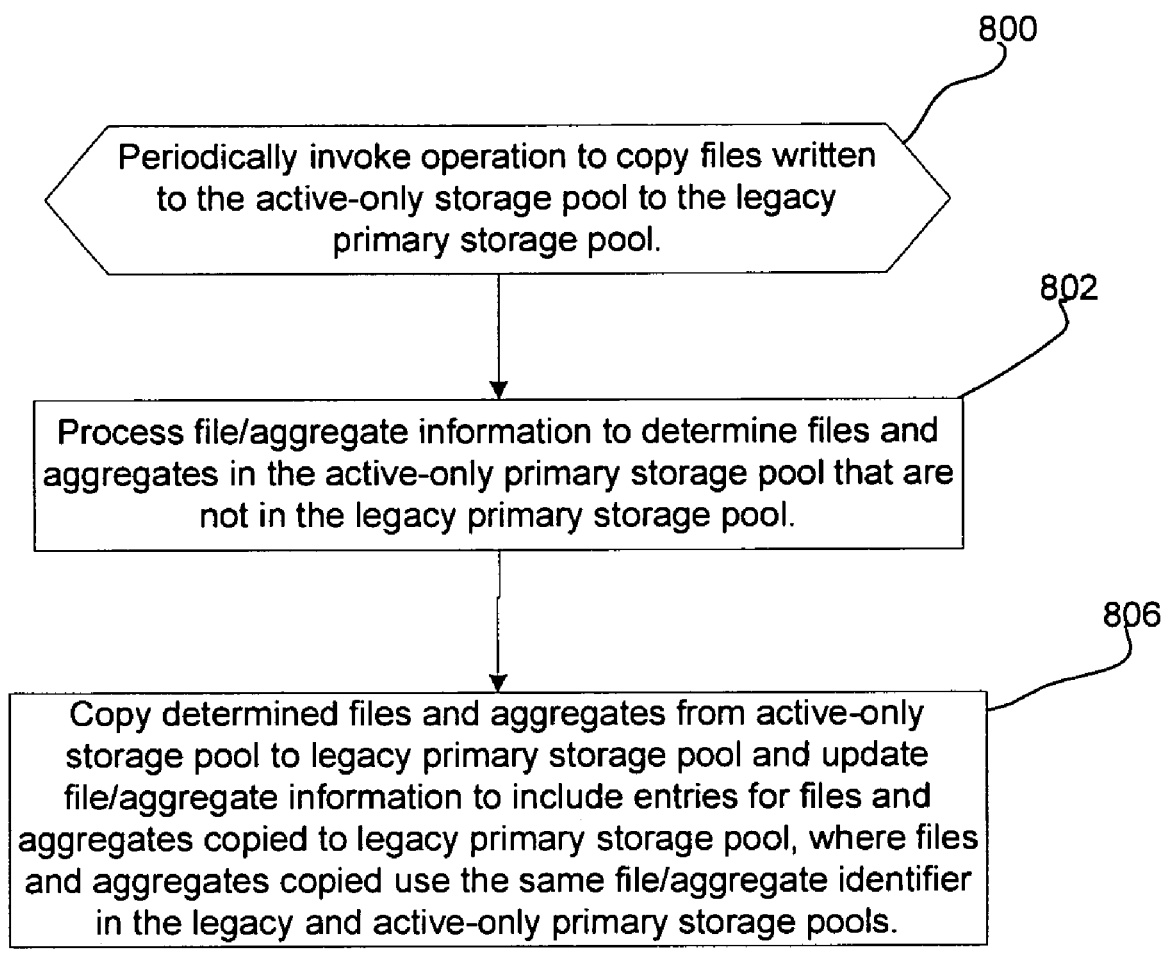
FIG. 18 illustrates an embodiment of operations to migrate files from the active-only primary storage pool to the legacy primary storage pool.

FIG. 18 illustrates an embodiment of operations performed by the storage management software 12 to migrate updates applied to the active-only primary storage pool 704 to the legacy primary storage pool 700. Upon initiating the operations (at block 800) to migrate files, the storage management software 12 processes (at block 802) information, such as file/aggregate information 50, to determine files and aggregates in the active-only primary storage pool 704 that are not in the legacy primary storage pool 700. The recently added determined files and aggregates are copied (at block 806) from the active-only storage pool 704 to the legacy primary storage pool 700. Further, the file/aggregate information 50 is updated to include entries for files and aggregates copied to the legacy primary storage pool, where files and aggregates copied may use the same file/aggregate identifier in the legacy and active-only primary storage pools.

Figure 19:
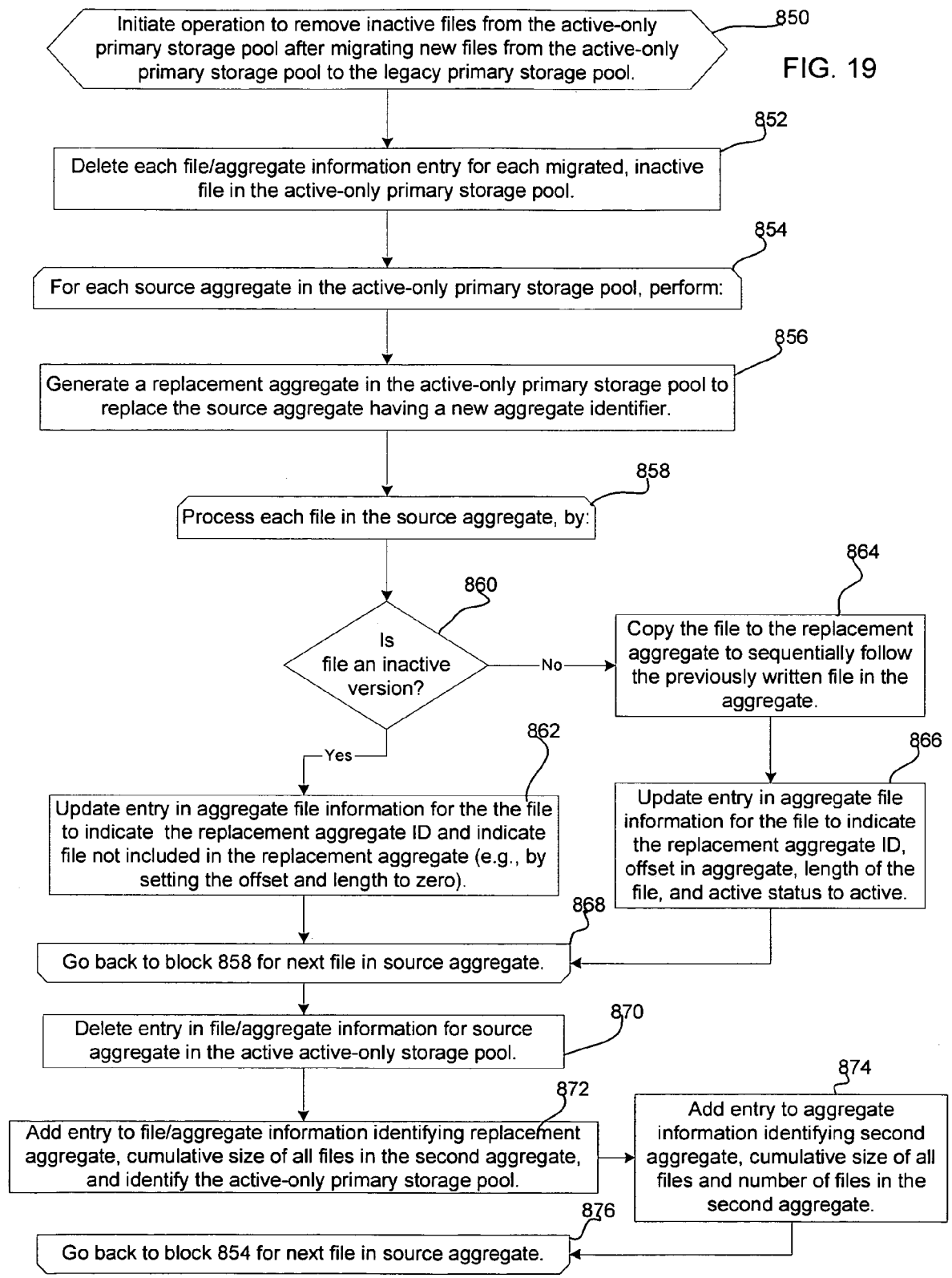
FIG. 19 illustrates an embodiment of operations to remove inactive files from the active-only primary storage pool.

After files and updates are copied-to the legacy primary storage pool 700, the storage management software 12 may perform reclamation operations shown in FIG. 19 to remove any inactive files from the active-only primary storage pool 704. Upon initiating (at block 850) the operations to remove inactive files, the storage management software 12 deletes (at block 852) each file/aggregate information 50 entry for each migrated, inactive file in the active-only primary storage pool. A loop is then performed at blocks 854 through 876 for each source aggregate in the active-only primary storage pool 704. For the source aggregate, a replacement aggregate is generated (at block 856) in the active-only primary storage pool 700 to replace the source aggregate having a new aggregate identifier. A loop is then performed at blocks 858 through 868 for each file in the source aggregate. The files in the source aggregate may be identified in the aggregate file information 80 having the aggregate identifier 84 for the source aggregate. The files in the source aggregate may be copied sequentially in the order in which the files are stored in the aggregate, starting from the file indicated in the aggregate file information 80 having the lowest offset 86 (FIG. 4). If (at block 860) the file being considered is an inactive version, then the file is not copied to the replacement aggregate. The entry in the aggregate file information 80 for the inactive file not copied is updated (at block 862) to indicate the replacement aggregate identifier 84 and to indicate the file as inactive. A file may be indicated as inactive by setting the offset 86 (FIG. 4) and length 88 in the file information 80 for that file to zero. In this way, although an inactive file is not copied to the replacement aggregate in the active-only primary storage pool 704, the aggregate file information 80 for the replacement aggregate identifies inactive files not copied to the replacement aggregate.

If (at block 860) the file in the aggregate is active, then the file is copied (at block 864) to the replacement aggregate in sequence. The aggregate file information entry 80 (FIG. 4) identifying the copied file is updated (at block 866) to indicate the replacement aggregate identifier in field 84 and to indicate that the copied file is active. The file may be indicated as active and included in the replacement aggregate by setting the offset 86 to the offset of the copied file in the replacement aggregate and the length 88 of the copied file. The active status 90 may be set to active.

After copying all active files, the storage management software 12 may delete (at block 870) the file/aggregate information entry 50 for the source aggregate in the active-only primary storage pool 704. A file/aggregate information entry 50 is added (at block 872) identifying in field 52 (FIG. 2) the replacement aggregate, a cumulative size 54 of all files in the replacement aggregate, and identifying in field 56 the active-only primary storage pool 704. An aggregate information entry 70 (FIG. 3) is further added (at block 874) to the aggregate information identifying in field 72 the replacement aggregate, a cumulative size of all files 74 and number of files 76 in the target aggregate.

With the operations of FIG. 19, the active-only primary storage pool is processed to remove inactive files from aggregates and inactive files not within aggregates to maintain the active-only nature of the active-only primary storage pool 704. Active files in the aggregate in the active-only primary storage pool 704 are copied sequentially to a replacement aggregate in the active-only primary storage pool 704 so they are arranged sequentially in the same order they occur in the aggregate, but without inactive files. The legacy primary storage pool 700 maintains the inactive files that are removed from the active-only primary storage pool 704 because the reclamation of FIG. 19 occurs after files are migrated to the legacy primary storage pool 700 according to the operations of FIG. 18. As a result of the copy operations of FIG. 18 and reclamation operations of FIG. 19, the legacy primary storage pool 700 may maintain both active and inactive versions of files and the active-only primary storage pool 704 maintains only active versions of files.

Further, the operations of FIGS. 13 and 19 copy active files from the legacy primary storage pool 700 to the active-only primary storage pool 704 and remove inactive files from the active-only primary storage pool 704. These operations preserve the correspondence between active-only aggregates in the active-only primary storage pool 704 and conventional aggregates in the legacy primary storage pool 700 by creating dummy database entries for all inactive files in the active-only primary storage pool 704. The "dummy database entries" comprise those entries for files in the aggregate file information having a length and offset of zero, e.g., 728 in the aggregate file information table 714 in FIG. 20. This correspondence is important for subsequent data movement operations such as migration and storage pool backup/restore. This maintains the correspondence of entries for the active-only primary storage pool 704 and those of the legacy primary storage pool 700.

Figure 20:
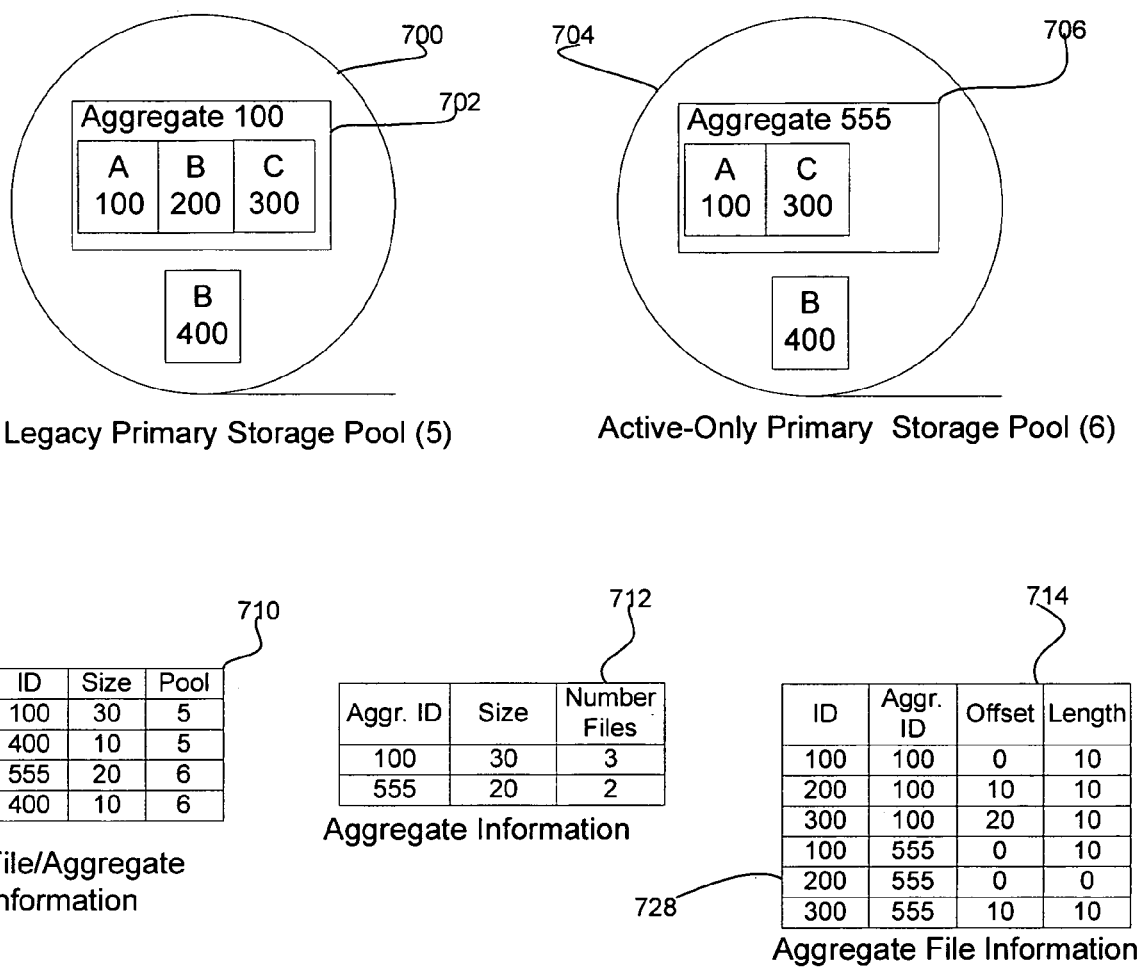

FIG. 20 illustrates an example of a legacy primary storage pool 700 and active-only storage pool 704 and tables having information on the files and aggregates in the storage pools. FIG. 20 shows the storage pools 700, 704 shown in FIG. 16 after active files are copied from the legacy primary storage pool 700 to the active-only primary storage pool 704 according to the operations of FIG. 17. In one embodiment, the storage management software 12 maintains a file/aggregate information table 710, an aggregate information table 712, and an aggregate file information table 714 having information on the files and aggregates in the legacy and active-only storage pools 700, 704. The file/aggregate information table 710 includes entries, such as entry 50 (FIG. 2), for each aggregate 702 and 706 having identifiers 100 and 555 and entries for the file B 400 having identifier 400 in both storage pools 700 and 704. The aggregate information table 712, such as entry 70 (FIG. 3), includes an entry for the aggregate having ID 100 and an entry for the aggregate having ID 555. The aggregate file information table 714 includes entries, such as entry 80 (FIG. 4), for each file in the aggregate 702 (having ID 100) and the aggregate 706 (having ID 555). Entry 728 in the aggregate file information table 714 indicates that in the aggregate 555 the file B 200 is not included in the aggregate, but is an inactive file not copied to the aggregate 704.

Figure 21:
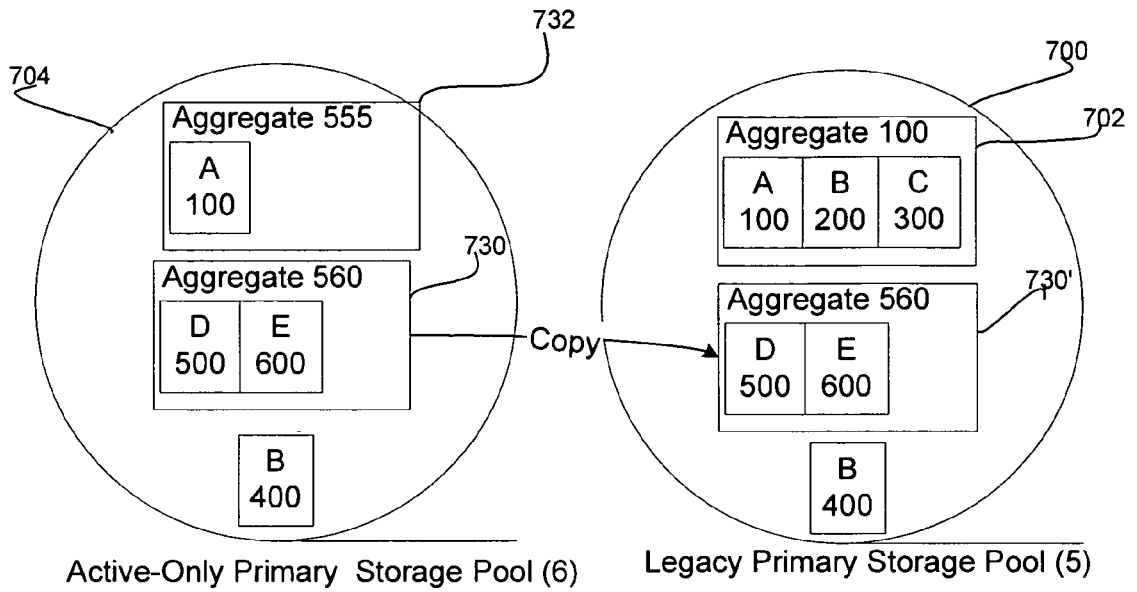

FIG. 21 illustrates an example of storage pools and tables having information on the aggregates in the storage pools 700, 704 after a new aggregate 730 (having ID 560) added to the active-only primary storage pool 704 is copied/migrated to a copy of the aggregate 730' in the legacy primary storage pool 700 according to the operations of FIG. 18 and after inactive files are removed from the active-only primary storage pool 704 according to the operations of FIG. 19. For instance, aggregate 732 comprises a replacement aggregate for source aggregate 706 in FIG. 20 from which the inactive file C 300 (FIG. 20) was removed according to the operations of FIG. 19. File C may have become inactive as a result of being deleted on a client machine 2a, 2b . . . 2n.

The updated file/aggregate information table 734 in FIG. 21 includes new entries for the aggregate ID 560 that is included in both the legacy 700 and active-only 704 primary storage pools. The updated aggregate information table 736 includes a new entry for the aggregate ID 560. The updated aggregate file information table 738 includes new entries for the files D 500 and E 600 in the aggregate ID 560. Note, there are only entries in the aggregate file information 738 for one aggregate ID 560 even though there are two instances 730 and 730' of this aggregate in both primary storage pools 700, 704. Further, the inactive file C 300 removed from the aggregate 732 is still indicated in the entries for the aggregate 706 (having ID 555). The inactive file is indicated in entry 740 for file 300 in the aggregate ID 555 by having an offset and length of zero.

Figure 22:
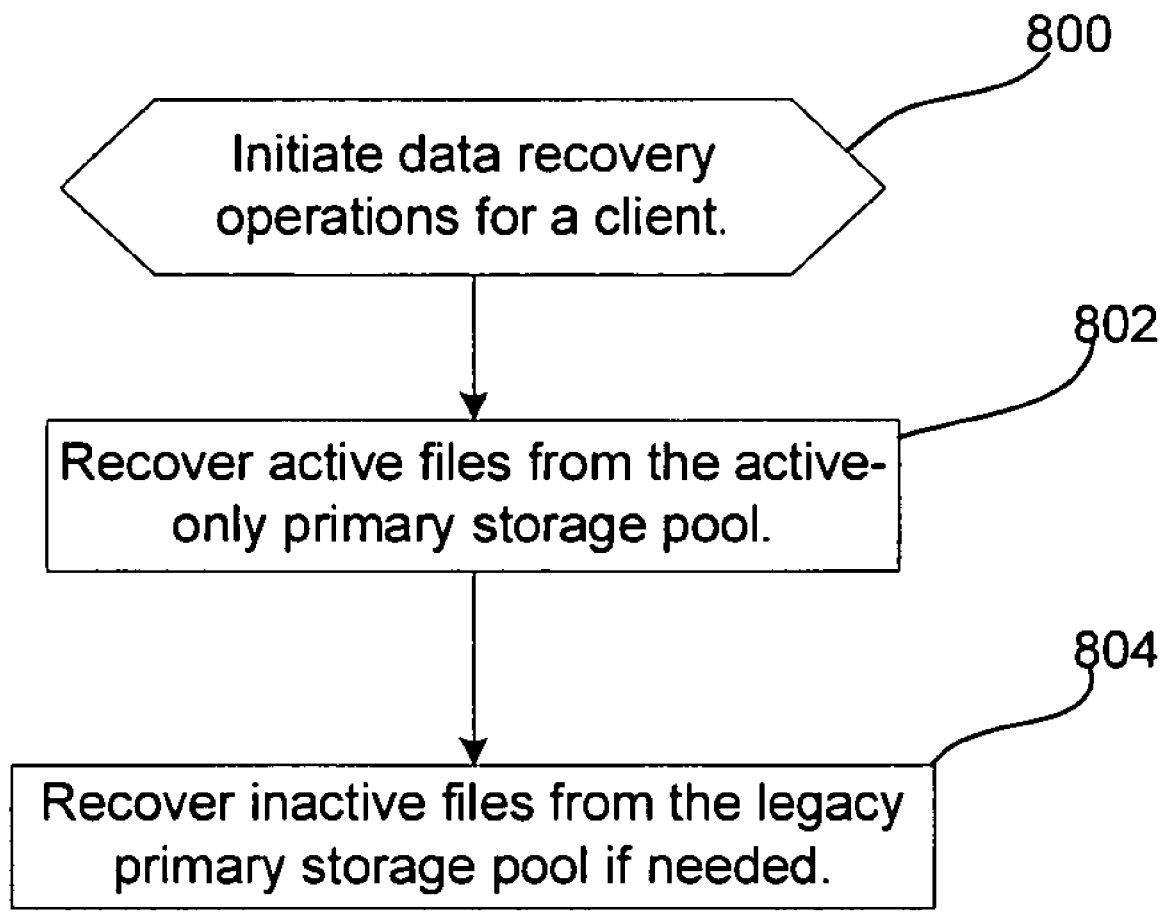
FIG. 22 illustrates an embodiment of operations to restore data from the active-only primary storage pool.

FIG. 22 illustrates an embodiment of operations to handle a data recovery request by a client 2a, 2b . . . 2n. In response to initiating the data recovery (at block 800), active files are recovered (at block 802) from the active-only primary storage pool 704 and inactive files may be recovered (at block 804) from the legacy primary storage pool 700 if needed. In an additional embodiment, data may be recovered from a copy storage pool including both inactive and active data into the active-only primary storage pool 704 by only restoring active files using the operations of FIG. 13.

Described embodiments provide legacy and active-only primary storage pools that may be implemented in a sequential media. The active-only primary storage pool may be created from the active versions of files and only the active versions of files in aggregates from the legacy primary storage pool. After the active-only storage pool is established, new files and updates are applied directly to the active-only primary storage pool. At certain points, files may be copied from the active-only primary storage pool to the legacy primary storage pool and then reclamation performed after the copying to remove inactive files from the active-only primary storage pool. The legacy primary storage pool thus maintains all inactive and active files, while the active-only primary storage pool is maintained to include active files.

In the event of data loss or system failure, the clients may recover their data from the active-only primary storage pool. Maintaining only active files in the active-only primary storage pool allows faster data recovery in the event of a failure by providing only the active files, which the clients are more likely to need than inactive files. If clients need inactive files, such files may be recovered separately from the legacy primary storage pool. Moreover, the active-only copy storage pools are more space efficient because they conserve space by storing only active versions of files, and not inactive versions. Thus, the active-only copy storage pools require less off-site storage by not storing inactive versions of files.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

In described embodiments, the aggregate files were contained in a sequential access media, such as a sequential disk or tape. In an alternative embodiment, the described operations may apply to an aggregate file in a random access media.

In described embodiments, the primary storage pool maintains inactive as well as active files. In an alternative embodiment, the primary storage pool may comprise an active-only storage pool and inactive files are removed from aggregates as a result of a reclamation process, such as shown in FIG. 9.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Further, when a reference letter, such as "a", "b", or "n" is used to denote a certain number of items, the reference "a", "b" or "n" used with different elements may indicate the same or different number of such elements.

FIGS. 2, 3, 4, 10, 11, 14, 15, 20, and 21 show information maintained in a certain format. In alternative embodiments, the information shown in FIGS. 2, 3, 4, 10, 11, 14, 15, 20, and 21 may be maintained in alternative data structures and formats, and in different combinations.

The illustrated operations of FIGS. 6, 7, 8, 9, 13, 17-19, and 22 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
providing a first storage pool including at least a first aggregate including a plurality of active and inactive files written in a sequential ordering to the first aggregate;
generating a second aggregate in a second storage pool;
determining active versions of files in the first aggregate that satisfy at least one criterion;
copying the determined active versions of files from the first aggregate to the second aggregate in the second storage pool in the sequential ordering of the first aggregate, wherein the second aggregate does not include inactive versions of files in the first storage pool, wherein files are stored sequentially in the first and second aggregates, and wherein the active versions of the files in the first aggregate are written sequentially to the second aggregate such that only the active version of the files are stored sequentially in the second aggregate; and
maintaining aggregate file information having an entry for each file stored in the first aggregate, wherein each entry indicates a file identifier, a first aggregate identifier, and an ordering of the file in the first aggregate, wherein the sequential ordering of files in the first aggregate is indicated by the order indicated in the entries for the files of the first aggregate in the aggregate file information, wherein copying the files from the first aggregate in the sequential ordering comprises copying the files according to the order indicated in the entries of the files in the first aggregate in the aggregate file information.

2. The method of claim 1, wherein the criteria include at least one of a file age, a file size, and a client that generated the file, wherein the operations further comprise:
copying active versions of files that satisfy the criteria and are not included in one aggregate in the first storage pool to the second storage pool;
copying active versions of files that satisfy the criteria from additional aggregates in the first storage pool to new aggregates in the second storage pool; and
indicating to apply updates to the second storage pool in response to copying all active versions of files within aggregates and not within aggregates in the first storage pool to the second storage pool.

3. The method of claim 1, further comprising:
indicating a change to cause updates to files to be applied to the second storage pool before being applied to the first storage pool;
applying updates to files in the second storage pool in response to indicating the change; and
copying updates to files applied to the second storage pool to the first storage pool, wherein the first storage pool maintains inactive and active versions of files.

4. The method of claim 3, further comprising:
removing inactive versions of files from the second storage pool that are within aggregates and not included in aggregates in response to copying updates to files applied to the second storage pool to the first storage pool.

5. The method of claim 4, wherein removing inactive versions of files from aggregates in the second storage pool comprises performing for each source aggregate in the second storage pool:
generating a replacement aggregate in the second storage pool for the source aggregate;
copying active files from the source aggregate to the replacement aggregate; and
removing indication of the source aggregate in the second storage pool.

6. The method of claim 1, further comprising:
restoring active files from the second storage pool to a client in response to a data recovery event; and
restoring inactive files from the first storage pool to the client in response to the data recovery event.

7. The method of claim 1, wherein the first aggregate has a first identifier and the second aggregate has a second identifier, further comprising:
providing a data structure having information indicating the first aggregate as included in the first storage pool and having the first identifier; and
adding information to the data structure indicating the second aggregate as included in the second storage pool and having the second identifier in response to copying active versions of files from the first aggregate to the second aggregate.

8. The method of claim 1, wherein the operations further comprise:
providing a data structure having information on files included in the first aggregate including, for each file in the first aggregate, a file identifier of the file and a first aggregate identifier; and
adding information to the data structure on files in the second aggregate including, for each file in the first aggregate, a file identifier of the file, a second aggregate identifier, and indication whether the file is active or inactive, wherein inactive files in the first aggregate indicated in the information on files in the second aggregate are not included in the second aggregate.

9. The method of claim 1, wherein each storage pool comprises a sequential access storage pool in which data is stored sequentially in a file volume, wherein each sequential access storage pool is implemented in a random access media, and wherein data in the sequential access stored pool is maintained as data is maintained for a sequential access device.

10. The method of claim 1, wherein the order indicated in the entries in the aggregate file information comprises an offset indicating an offset of the file in the first aggregate, wherein the files in the first aggregate are copied according to an order of their offsets indicated in the file entries in the aggregate file information.

11. The method of claim 1, further comprising:
adding entries to the aggregate file information for each file copied to the second aggregate, wherein each added entry identifies the copied file, a second aggregate identifier, and an order in which the file was written to the second aggregate.

12. The method of claim 11, further comprising:
adding an entry to the aggregate file information for each inactive file in the first aggregate not copied to the second aggregate indicating the file identifier of the inactive file not copied, the second aggregate identifier, and indication that the file was not copied.

13. The method of claim 1, further comprising:
maintaining aggregate information for the first and second aggregates, wherein the information for each of the first and second aggregates indicates the first or second aggregate identifier, a number of files in the first or second aggregate, and a size of the first or second aggregate.

14. The method of claim 1, wherein the sequential ordering of the files in the first aggregate is indicated in aggregate file information.

15. A system in communication with a first storage pool and a second storage pool, comprising:

a processor;

a computer readable storage medium in communication with the processor including code to cause operations, the operations comprising:

provinding a first storage pool including at least a first aggregate including a plurality of active and inactive files written in a sequential ordering to the first aggregate;

generating a second aggregate in a second storage pool;

determining active versions of files in the first aggregate that satisfy at least one criterion;

copying the determined active versions of files from the first aggregate to the second aggregate in the second storage pool in the sequential ordering of the first aggregate, wherein the second aggregate does not include inactive versions of files in the first storage pool, wherein files are stored sequentially in the first and second aggregates, and wherein the active versions of the files in the first aggregate are written sequentially to the second aggregate such that only the active version of the files are stored sequentially in the second aggregate; and maintaining aggregate file information having an entry for each file stored in the first aggregate, wherein each entry indicates a file identifier, a first aggregate identifier, and an ordering of the file in the first aggregate, wherein the sequential ordering of files in the first aggregate is indicated by the order indicated in the entries for the files of the first aggregate in the aggregate file information, wherein copying the files from the first aggregate in the sequential ordering comprises copying the files according to the order indicated in the entries of the files in the first aggregate in the aggregate file information.

16. The system of claim 15, wherein the criteria include at least one of a file age, a file size, and a client that generated the file, wherein the operations further comprise:

copying active versions of files that satisfy the criteria and are not included in one aggregate in the first storage pool to the second storage pool;

copying active versions of files that satisfy the criteria from additional aggregates in the first storage pool to new aggregates in the second storage pool; and indicating to apply updates to the second storage pool in response to copying all active versions of files within aggregates and not within aggregates in the first storage pool to the second storage pool.

17. The system of claim 15, wherein the operations further comprise:

indicating a change to cause updates to files to be applied to the second storage pool before being applied to the first storage pool;

applying updates to files in the second storage pool in response to indicating the change; and copying updates to files applied to the second storage pool to the first storage pool, wherein the first storage pool maintains inactive and active versions of files.

18. The system of claim 15, wherein the operations further comprise:

restoring active files from the second storage pool to a client in response to a data recovery event; and restoring inactive files from the first storage pool to the client in response to the data recovery event.

19. The system of claim 15, wherein the first aggregate has a first identifier and the second aggregate has a second identifier, wherein the operations further comprise:

providing a data structure having information indicating the first aggregate as included in the first storage pool and having the first identifier; and adding information to the data structure indicating the second aggregate as included in the second storage pool and having the second identifier in response to copying active versions of files from the first aggregate to the second aggregate.

20. The system of claim 15, wherein the operations further comprise:

providing a data structure having information on files included in the first aggregate including, for each file in the first aggregate, a file identifier of the file and a first aggregate identifier; and adding information to the data structure on files in the second aggregate including, for each file in the first aggregate, a file identifier of the file, a second aggregate identifier, and indication whether the file is active or inactive, wherein inactive files in the first aggregate indicated in the information on files in the second aggregate are not included in the second aggregate.

21. The system of claim 15, wherein each storage pool comprises a sequential access storage pool in which data is stored sequentially in a file volume, wherein each sequential access storage pool is implemented in a random access media, and wherein data in the sequential access storage pool is maintained as data is maintained for a sequential access device.

22. The system of claim 15, wherein the order indicated in the entries in the aggregate file information comprises an offset indicating an offset of the file in the first aggregate, wherein the files in the first aggregate are copied according to an order of their offsets indicated in the file entries in the aggregate file information.

23. An article of manufacture comprising a computer readable storage medium including code executed by a processor to perform operations with respect to a first storage pool and a second storage pool, wherein the operations comprise:

providing a first storage pool including at least a first aggregate including a plurality of active and inactive files written in a sequential ordering to the first aggregate;

generating a second aggregate in a second storage pool;

determining active versions of files in the first aggregate that satisfy at least one criterion;

copying the determined active versions of files from the first aggregate to the second aggregate in the second storage pool in the sequential ordering of the first aggregate, wherein the second aggregate does not include inactive versions of files in the first storage pool, wherein files are stored sequentially in the first and second aggregates, and wherein the active versions of the files in the first aggregate are written sequentially to the second aggregate such that only the active version of the files are stored sequentially in the second aggregate; and maintaining aggregate file information having an entry for each file stored in the first aggregate, wherein each entry indicates a file identifier, a first aggregate identifier, and an ordering of the file in the first aggregate, wherein the sequential ordering of files in the first aggregate is indicated by the order indicated in the entries for the files of the first aggregate in the aggregate file information, wherein copying the files from the first aggregate in the sequential ordering comprises copying the files according to the order indicated in the entries of the files in the first aggregate in the aggregate file information.

24. The article of manufacture of claim 23, wherein the criteria include at least one of a file age, a file size, and a client that generated the file, wherein the operations further comprise:

copying active versions of files that satisfy the criteria and are not included in one aggregate in the first storage pool to the second storage pool;

copying active versions of files that satisfy the criteria from additional aggregates in the first storage pool to new aggregates in the second storage pool; and indicating to apply updates to the second storage pool in response to copying all active versions of files within aggregates and not within aggregates in the first storage pool to the second storage pool.

25. The article of manufacture of claim 23, wherein the operations further comprise:

indicating a change to cause updates to files to be applied to the second storage pool before being applied to the first storage pool;

applying updates to files in the second storage pool in response to indicating the change; and copying updates to files applied to the second storage pool to the first storage pool, wherein the first storage pool maintains inactive and active versions of files.

26. The article of manufacture of claim 23, wherein the operations further comprise:

restoring active files from the second storage pool to a client in response to a data recovery event; and restoring inactive files from the first storage pool to the client in response to the data recovery event.

27. The article of manufacture of claim 23, wherein the first aggregate has a first identifier and the second aggregate has a second identifier, wherein the operations further comprise:

providing a data structure having information indicating the first aggregate as included in the first storage pool and having the first identifier; and adding information to the data structure indicating the second aggregate as included in the second storage pool and having the second identifier in response to copying active versions of files from the first aggregate to the second aggregate.

28. The article of manufacture of claim 23, wherein the operations further comprise:

providing a data structure having information on files included in the first aggregate including, for each file in the first aggregate, a file identifier of the file and a first aggregate identifier; and adding information to the data structure on files in the second aggregate including, for each file in the first aggregate, a file identifier of the file, a second aggregate identifier, and indication whether the file is active or inactive, wherein inactive files in the first aggregate indicated in the information on files in the second aggregate are not included in the second aggregate.

29. The article of manufacture of claim 23, wherein each storage pool comprises a sequential access storage pool in which data is stored sequentially in a file volume, wherein each sequential access storage pool is implemented in a random access media, and wherein data in the sequential access stored pool is maintained as data is maintained for a sequential access device.

30. The article of manufacture of claim 23, wherein the order indicated in the entries in the aggregate file information comprises an offset indicating an offset of the file in the first aggregate, wherein the files in the first aggregate are copied according to an order of their offsets indicated in the file entries in the aggregate file information.

* * * * *